US012508898B2

(12) United States Patent
Yanagihara et al.

(10) Patent No.: US 12,508,898 B2
(45) Date of Patent: Dec. 30, 2025

(54) VEHICLE DRIVE DEVICE

(71) Applicants: AISIN CORPORATION, Kariya (JP); MITSUBISHI JIDOSHA KOGYO KABUSHIKI KAISHA, Tokyo (JP)

(72) Inventors: Yuki Yanagihara, Kariya (JP); Naoki Takahashi, Tokyo (JP); Kiminobu Terao, Tokyo (JP); Takuya Ogasawara, Okazaki (JP); Yosuke Morimoto, Okazaki (JP)

(73) Assignees: AISIN CORPORATION, Aichi (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/552,547

(22) PCT Filed: Mar. 28, 2022

(86) PCT No.: PCT/JP2022/014968
§ 371 (c)(1),
(2) Date: Sep. 26, 2023

(87) PCT Pub. No.: WO2022/210526
PCT Pub. Date: Oct. 6, 2022

(65) Prior Publication Data
US 2024/0181871 A1 Jun. 6, 2024

(30) Foreign Application Priority Data
Mar. 30, 2021 (JP) .................................. 2021-058607

(51) Int. Cl.
B60K 17/12 (2006.01)
B60K 17/04 (2006.01)
(Continued)

(52) U.S. Cl.
CPC ............ B60K 17/12 (2013.01); B60K 17/043 (2013.01); F16H 57/023 (2013.01);
(Continued)

(58) Field of Classification Search
CPC .................. B60K 17/12; B60K 17/043; B60K 2007/0061; F16H 57/023; F16H 57/0436;
(Continued)

(56) References Cited

U.S. PATENT DOCUMENTS

2013/0145879 A1* 6/2013 Nakamura .......... F16H 57/0441 74/467
2018/0294693 A1* 10/2018 Yu .............................. H02K 9/19
2020/0240314 A1* 7/2020 Goto .................... F16H 57/0476

FOREIGN PATENT DOCUMENTS

CN 112152384 A * 12/2020 ............... H02K 9/19
JP 2013052849 A 3/2013
(Continued)

OTHER PUBLICATIONS

Translation of CN 112152384 A (Year: 2020).*
(Continued)

*Primary Examiner* — Jason D Shanske
*Assistant Examiner* — Scott Lawrence Strickler
(74) *Attorney, Agent, or Firm* — BUCHANAN INGERSOLL & ROONEY PC

(57) ABSTRACT

A vehicle drive device includes a rotating electric machine disposed on a first axis, an output gear mechanism and an output member disposed on a second axis, and a case that houses these elements. The second axis is disposed below the first axis, a suction port of an oil pump is disposed below the first axis and the second axis and between the first axis and the second axis in a width direction, an outermost gear is disposed so that a direction of rotation at a lower end portion of the outermost gear during forward movement of (Continued)

a vehicle points toward the suction port, and a part of a peripheral wall section of the case that faces a lower surface of the rotating electric machine is inclined downward toward the suction port.

14 Claims, 10 Drawing Sheets

(51) Int. Cl.
*F16H 57/02* (2012.01)
*F16H 57/023* (2012.01)
*F16H 57/04* (2010.01)
*B60K 7/00* (2006.01)

(52) U.S. Cl.
CPC .. *F16H 57/0436* (2013.01); *B60K 2007/0061* (2013.01); *F16H 2057/02034* (2013.01); *F16H 2057/02043* (2013.01)

(58) Field of Classification Search
CPC ....... F16H 2057/02034; F16H 57/0443; F16H 57/0476; F16H 57/0495; F16H 57/04; H02K 7/116; G60K 1/02
See application file for complete search history.

(56) References Cited

FOREIGN PATENT DOCUMENTS

| JP | 2013119918 A | 6/2013 | |
|----|----|----|----|
| JP | 2017133564 A | 8/2017 | |
| WO | WO-2020194950 A1 * | 10/2020 | ............. F16H 48/36 |
| WO | WO-2020203909 A1 * | 10/2020 | ............... H02K 9/19 |
| WO | WO-2020203916 A1 * | 10/2020 | ............... F16H 1/06 |

OTHER PUBLICATIONS

Translation of WO 2020/203909 A1 (Year: 2020).*
Translation of WO 2020/203916 A1 (Year: 2020).*
Translation of WO 2020/194950 A1 (Year: 2020).*
International Search Report (PCT/ISA/210) with translation and Written Opinion (PCT/ISA/237) mailed on Jun. 14, 2022, by the Japan Patent Office as the International Searching Authority for International Application No. PCT/JP2022/014968. (9 pages).
Extended European Search Report issued on Jul. 24, 2024, in corresponding European Patent Application No. 22780737.7. (9 pages).

* cited by examiner

VEHICLE DRIVE DEVICE

TECHNICAL FIELD

The disclosure here relates to a vehicle drive device.

BACKGROUND ART

A vehicle drive device currently in use includes a rotating electric machine, an output member that is in driving connection with a wheel or wheels, a power transmission mechanism that transmits the torque of the rotating electric machine to the output member; and a case that houses the rotating electric machine and the power transmission mechanism. This vehicle drive device is further provided with an oil pump for cooling the rotating electric machine, for example. An oil pump usually includes a strainer for removing foreign matter present in the oil, expels oil that has been drawn in through a suction port of the strainer, and supplies the oil to the rotating electric machine and the like.

One example of this type of vehicle drive device is disclosed in JP2013-52849A (Patent Document 1). In the vehicle drive device of Patent Document 1, a strainer (the "strainer 71") is disposed at a position directly above the flat bottom surface of the case (the "case 11"). The suction port (or "suction port 71b") of the strainer, which serves as the suction port of the oil pump, is disposed near the center in both the front-rear direction and the left-right direction. This means that even if the oil level becomes tilted due to the vehicle accelerating, decelerating, or turning, it is possible to avoid exposure of the suction port above the oil level, which prevents the production of air bubbles in the oil.

However, if the speed at which oil returns to the vicinity of the suction port of the oil pump after cooling the rotating electric machine is slower than the speed at which the oil pump draws in and expels oil, the supplying of oil to the oil pump may not keep up, resulting in an actual risk of air bubbles being produced. No countermeasures for this risk are taken in Patent Document 1.

PRIOR ART DOCUMENTS

Patent Documents

Patent Document 1: JP2013-52849A

DISCLOSURE

Problem to be Solved

For this reason, there is demand for a vehicle drive device that can effectively suppress the production of air bubbles at an oil pump.

Means for Solving Problem

A vehicle drive device according to an aspect of the present disclosure includes:
- a rotating electric machine disposed on a first axis;
- an output member disposed on a second axis, which differs from the first axis, and in driving connection with a wheel;
- a power transmission mechanism configured to transmit torque of the rotating electric machine to the output member;
- a case configured to house the rotating electric machine and the power transmission mechanism; and
- an oil pump including a suction port, and configured to expel oil drawn in from the suction port, and to supply oil for cooling to the rotating electric machine, wherein the power transmission mechanism includes an output gear mechanism disposed on the second axis, the case includes a peripheral wall section surrounding the rotating electric machine and the output gear mechanism, with (i) a direction parallel to the first axis and the second axis being an axial direction, (ii) a direction perpendicular to a vertical direction in an axial direction view along the axial direction in a state where the vehicle drive device has been mounted in a vehicle being a width direction, and (iii) a gear disposed in an outermost periphery of the output gear mechanism being an outermost gear, the second axis is disposed below the first axis, the suction port is disposed between the first axis and the second axis in the width direction, and is disposed below the first axis and the second axis in the vertical direction, the outermost gear is disposed so that a direction of rotation at a lower end portion of the outermost gear while the vehicle is moving forward points toward the suction port in the width direction, and a portion of an inner surface of the peripheral wall section facing a lower surface of the rotating electric machine is downwardly inclined in the width direction toward the suction port.

According to this configuration, the first axis is disposed in a direction pointed to by the direction of rotation of the lower end portion of the outermost gear, which is disposed on the second axis, when the vehicle is moving forward, and the suction port is disposed between the first axis and the second axis. This makes it possible to efficiently collect oil transported by the rotating outermost gear at the suction port. Since the inner surface part of the peripheral wall section facing the lower surface of the rotating electric machine is downwardly inclined toward the suction port, oil that has cooled the rotating electric machine can be received by the inner surface of the peripheral wall section and caused to flow down toward the suction port. By drawing in both the oil transported by the outermost gear on the second axis and the oil flowing down from the rotating electric machine side on the first axis from the suction port, it is possible to supply a sufficient amount of oil to the oil pump. Accordingly it is possible to effectively prevent the production of air bubbles at the air pump (that is, the drawing in of air at the oil pump).

These and other advantages and features of the technology according to the present disclosure will become more apparent from the following description of the embodiments, which refer to the accompanying drawings and are exemplary and non-limiting.

DETAILED DESCRIPTION

First Embodiment

Figure 1:
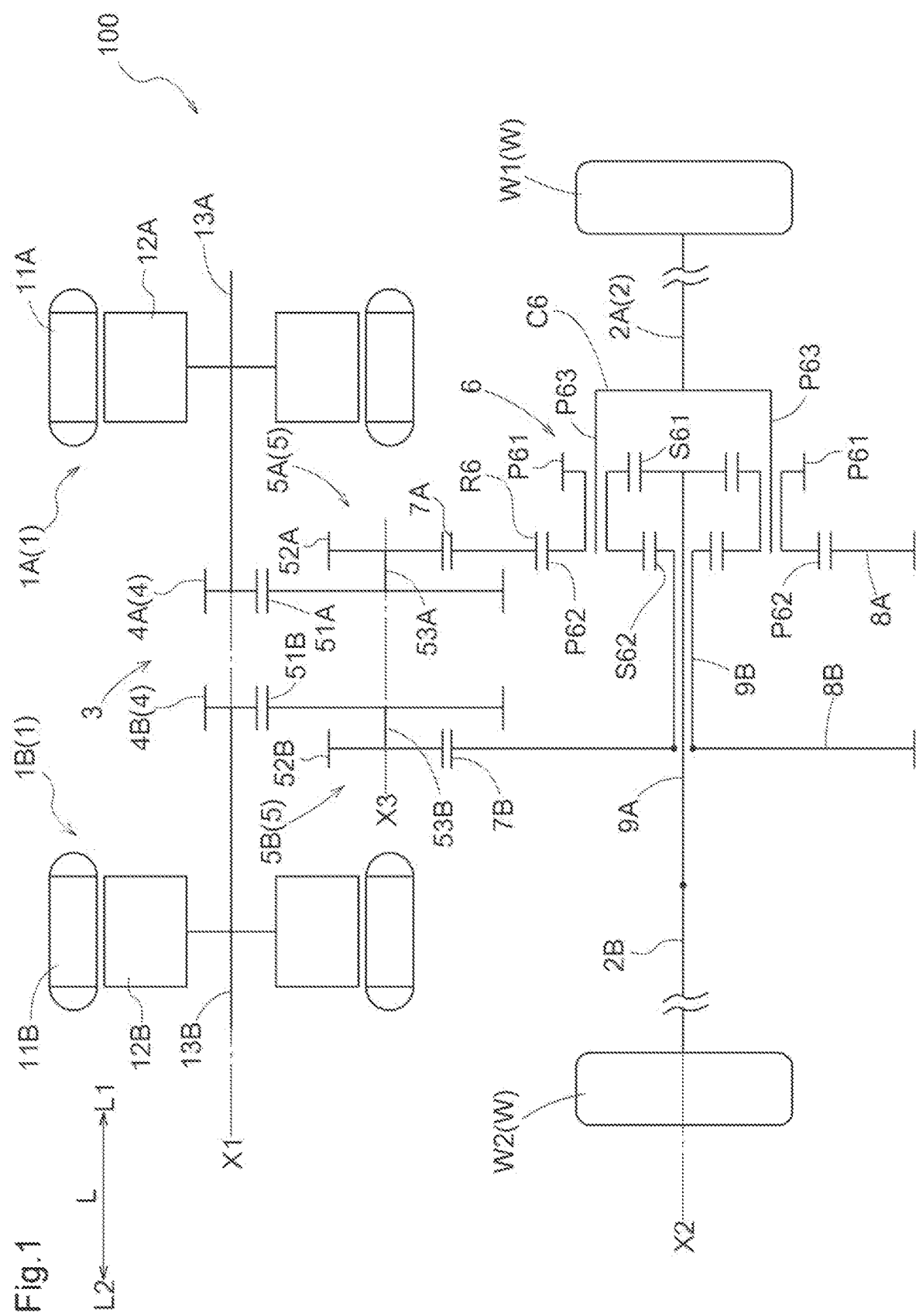
FIG. 1 is a skeleton diagram of a vehicle drive device according to a first embodiment.
Figure 2:
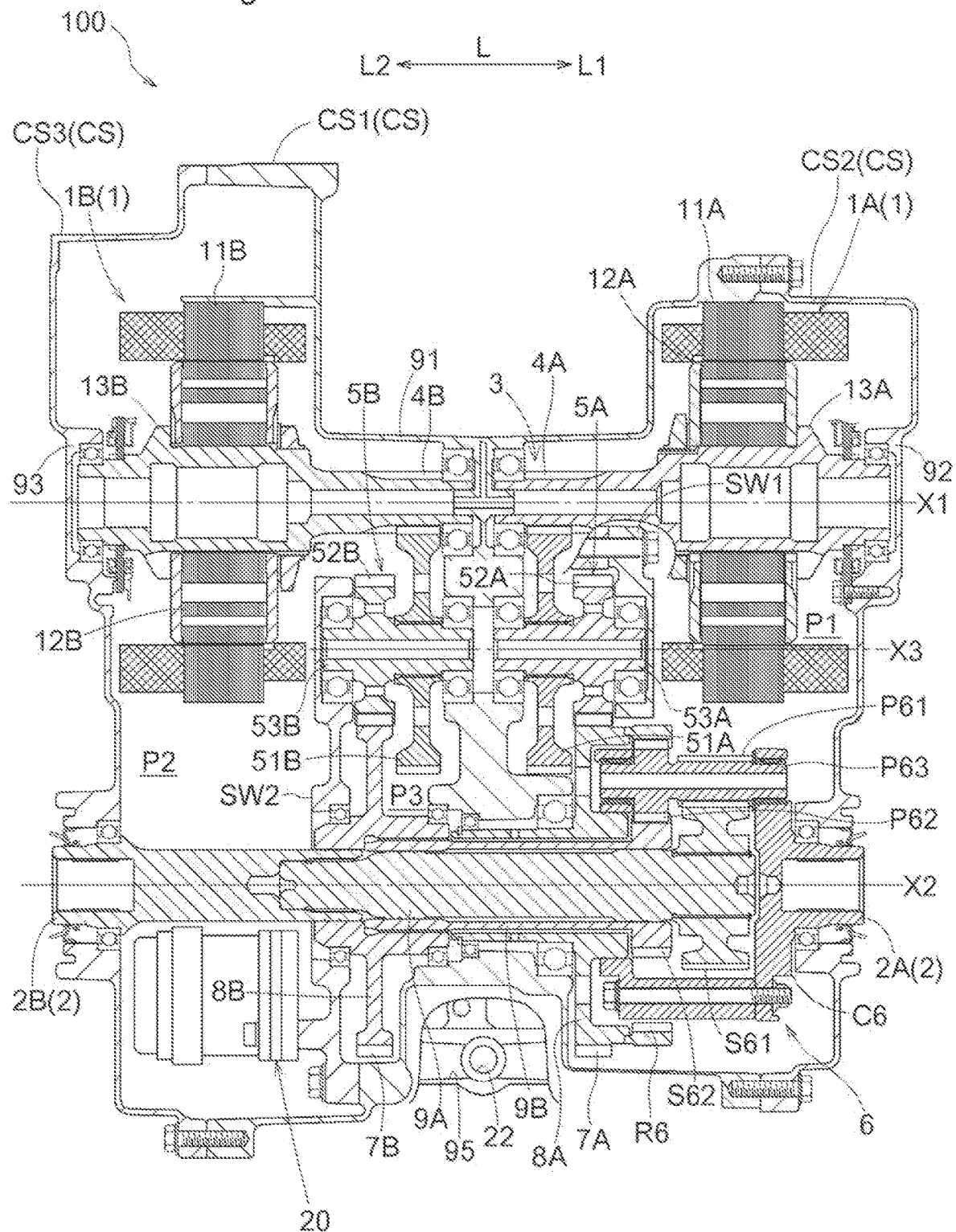
FIG. 2 is a cross-sectional view of the vehicle drive device.

A first embodiment of a vehicle drive device will now be described with reference to the drawings. As depicted in FIGS. 1 and 2, a vehicle drive device 100 includes rotating electric machines 1, output members 2 that are in driving connection with wheels W, a power transmission mechanism 3, and an oil pump 20. In the present embodiment, a first rotating electric machine 1A and a second rotating electric machine 1B are provided as the rotating electric machines 1. A first output member 2A that is in driving connection with a first wheel W1 that is a first example of the wheels W and a second output member 2B that is in driving connection with a second wheel W2 that is a second example of the wheels W are provided as the output member 2.

The power transmission mechanism 3 is equipped with a first input gear 4A, a second input gear 4B, a first counter gear mechanism 5A, a second counter gear mechanism 5B, and a differential gear mechanism 6. In this way the vehicle drive device 100 according to the present embodiment is equipped with the first rotating electric machine 1A, the second rotating electric machine 1B, the first output member 2A, the second output member 2B, the first input gear 4A, the second input gear 4B, the first counter gear mechanism 5A, the second counter gear mechanism 5B, and the differential gear mechanism 6. The vehicle drive device 100 includes a case CS that houses these components. Note that parts of the first output member 2A and the second output member 2B are exposed outside the case CS.

In this specification, the expression "rotating electric machine" is used as a concept including electric motors, electric generators, and motor-generators that function as both motors and generators as necessary.

The expression "in driving connection" refers to a state in which two rotating elements are connected in a manner that enables a driving force to be transmitted. This concept includes a state in which the two rotating elements are connected to rotate integrally and a state in which the two rotating elements are connected in a manner that enables a driving force to be transmitted via one or more transmission members. Such transmission members may include various members (shafts, gear mechanisms, belts, chains, and the like) that transmit rotational motion at the same speed or at a different speed, and engagement devices (devices that use frictional engagement, devices that engage through meshing, and the like) that selectively transmit rotational motion and a driving force.

The first rotating electric machine 1A and the second rotating electric machine 1B are disposed on a first axis X1. The first output member 2A and the second output member 2B are disposed on a second axis X2 that differs from the first axis X1. The first counter gear mechanism 5A and the second counter gear mechanism 5B are disposed on a third axis X3 that differs from the first axis X1 and the second axis X2. The first axis X1, the second axis X2, and the third axis X3 are disposed parallel to each other, and a direction parallel to these axes is referred to as the "axial direction L". In the present embodiment, the side where the first rotating electric machine 1A is disposed, which is also one side in the axial direction L, is referred to as the "axial direction-first side L1", and the other side (that is, the side where the second rotating electric machine 1B is disposed) on the opposite side is referred to as the "axial direction-second side L2". Also, in the following description, a state when looking along the axial direction L is referred to as an "axial direction view".

Figure 3:
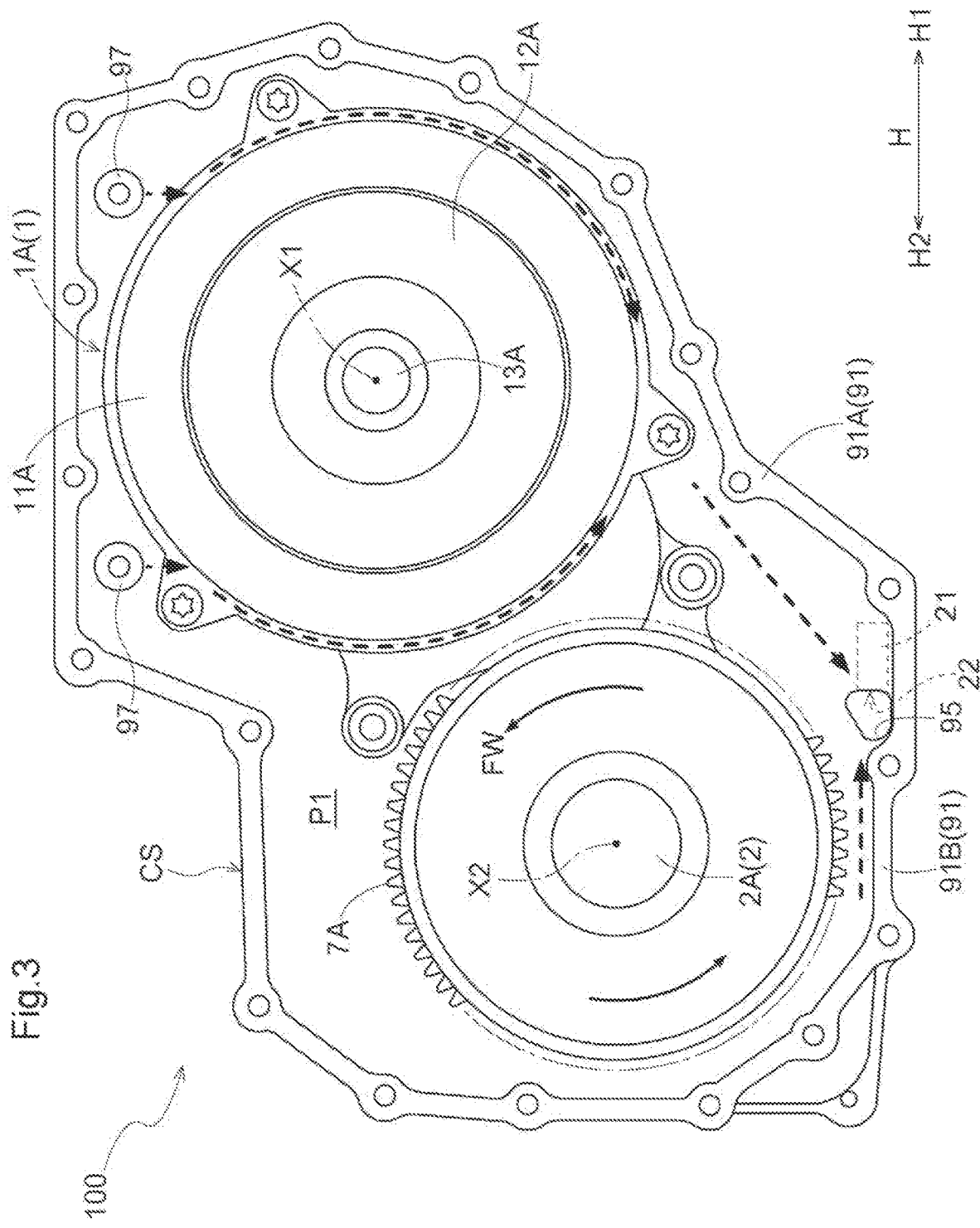
FIG. 3 is a side view of a first housing space side of a case interior.

In a state (or "vehicle mounted state") where the vehicle drive device 100 has been mounted in a vehicle, a direction perpendicular to the vertical direction in an axial direction view is referred to as the "width direction H" (see FIG. 3). In the present embodiment, the side in the width direction H where the first axis X1 (that is, the first rotating electric machine 1A and the second rotating electric machine 1B) is disposed is referred to as the "width direction-first side H1" and the other side (that is, the side where the differential gear mechanism 6 is disposed) that is opposite is referred to as the "width direction-second side H2". Note that in the present embodiment, the width direction H matches the front-rear direction for the vehicle, the width direction-first side H1 is the rear side of the vehicle, and the width direction-second side H2 is the front side of the vehicle.

The first rotating electric machine 1A includes a first stator 11A, which is fixed to the case CS, and a first rotor 12A, which is rotatably supported at a position radially inward of the first stator 11A. The first rotating electric machine 1A is powered by being supplied with electric power from a power storage device (not illustrated) and also supplies electric power generated by inertia of the vehicle or the like to the power storage device to charge the power storage device. The first rotor 12A is connected to integrally rotate with a first rotor shaft 13A. The first input gear 4A is formed on an outer surface at an axial direction-second side L2 part of the first rotor shaft 13A. In this way, the first input gear 4A is connected to rotate integrally with the first rotor 12A. In the present embodiment, the first input gear 4A corresponds to a "first gear" for the present disclosure.

The second rotating electric machine 1B includes a second stator 11B, which is fixed to the case CS, and a second rotor 12B, which is rotatably supported at a position radially inward of the second stator 11B. The second rotating electric machine 1B is powered by being supplied with electric power from a power storage device (not illustrated) and also supplies electric power generated by inertia of the vehicle or the like to the power storage device to charge the power storage device. The second rotor 12B is connected to integrally rotate with a second rotor shaft 13B. The second input gear 4B is formed on an outer surface at an axial direction-first side L1 part of the second rotor shaft 13B. In this way, the second input gear 4B is connected to rotate integrally with the second rotor 12B. In the present embodiment, the second input gear 4B corresponds to a "second gear" for the present disclosure.

The power transmission mechanism 3 transmits the torque of the rotating electric machines 1 to the output members 2. In the present embodiment, the power transmission mechanism 3 transmits the torque of the first rotating electric machine 1A and the second rotating electric machine 1B to the first output member 2A and the second output member 2B. The power transmission mechanism 3 includes the first input gear 4A and the second input gear 4B, the first counter gear mechanism 5A, the second counter gear mechanism 5B, and the differential gear mechanism 6 mentioned earlier.

The first counter gear mechanism 5A includes a first counter input gear 51A, a first counter output gear 52A, and a first counter shaft 53A. The first counter input gear 51A is an input element of the first counter gear mechanism 5A. The first counter input gear 51A meshes with the first input gear 4A. The first counter output gear 52A is an output element of the first counter gear mechanism 5A. The first counter output gear 52A is connected via a first counter shaft 53A in such a manner as to rotate integrally with the first counter input gear 51A. In the present embodiment, the first counter input gear 51A corresponds to a "third gear" for the present disclosure, and the first counter output gear 52A corresponds to a "fourth gear" for the present disclosure.

In the present embodiment, the first counter input gear 51A is formed with a larger diameter than the first counter output gear 52A. The first counter output gear 52A is disposed on the axial direction-first side L1 of the first counter input gear 51A. The first counter output gear 52A meshes with a first differential input gear 7A formed on a first connecting member 8A and is thereby in driving connection with the differential gear mechanism 6.

The second counter gear mechanism 5B includes a second counter input gear 51B, a second counter output gear 52B, and a second counter shaft 53B. The second counter input gear 51B is an input element of the second counter gear mechanism 5B. The second counter input gear 51B meshes with the second input gear 4B. The second counter output gear 52B is an output element of the second counter gear mechanism 5B. The second counter output gear 52B is connected via a second counter shaft 53B in such a manner as to rotate integrally with the second counter input gear 51B. In the present embodiment, the second counter input gear 51B corresponds to a "fifth gear" for the present disclosure, and the second counter output gear 52B corresponds to a "sixth gear" for the present disclosure.

In the present embodiment, the second counter input gear 51B is formed with a larger diameter than the second counter output gear 52B. The second counter output gear 52B is disposed on the axial direction-second side L2 of the second counter input gear 51B. The second counter output gear 52B meshes with a second differential input gear 7B formed on a second connecting member 8B and is thereby in driving connection with the differential gear mechanism 6.

The differential gear mechanism 6 provides a driving connection between the first counter output gear 52A and second counter output gear 52B and the first output member 2A and second output member 2B. The differential gear mechanism 6 includes the first differential input gear 7A, the second differential input gear 7B, and a planetary gear mechanism including four rotating elements, that is, a first sun gear S61, a second sun gear S62, a carrier C6, and a ring gear R6. In the present embodiment, the differential gear mechanism 6 corresponds to an "output gear mechanism" for the present disclosure.

The first differential input gear 7A meshes with the first counter output gear 52A. In the present embodiment, the first differential input gear 7A corresponds to a "seventh gear" for the present disclosure. The first differential input gear 7A is formed on the outer peripheral surface of the first connecting member 8A and rotates integrally with the ring gear R6 which is connected to rotate integrally with the first connecting member 8A. The first differential input gear 7A and the ring gear R6 that rotate integrally are one input element of the differential gear mechanism 6.

The second differential input gear 7B meshes with the second counter output gear 52B. In the present embodiment, the second differential input gear 7B corresponds to an "eighth gear" for the present disclosure. The second differential input gear 7B is formed on the outer peripheral surface of the second connecting member 8B and rotates integrally with the second sun gear S62, which is connected via the second connecting member 8B and a second connecting shaft 9B in such a manner as to rotate integrally. The second differential input gear 7B and the second sun gear S62 that integrally rotate are another input element of the differential gear mechanism 6.

In the present embodiment, the first differential input gear 7A and the second differential input gear 7B are formed with the same diameter. The first differential input gear 7A and the second differential input gear 7B are the gears in the differential gear mechanism 6 that are disposed at an outermost position. In the present embodiment, both the first differential input gear 7A and the second differential input gear 7B correspond to an "outermost gear" for the present disclosure.

In this way the present embodiment:
includes the first rotating electric machine 1A and the second rotating electric machine 1B as the rotating electric machines 1;
includes the first output member 2A that is in driving connection with the first wheel W1 and the second output member 2B that is in driving connection with the second wheel W2 as the output members 2;
further includes the power transmission mechanism 3 including the first input gear 4A that is connected to integrally rotate with the rotor 12A of the first rotating electric machine 1A, the second input gear 4B that is connected to integrally rotate with the rotor 12B of the second rotating electric machine 1B, the first counter gear mechanism 5A including the first counter input gear 51A, which meshes with the first input gear 4A, and the first counter output gear 52A, which integrally rotates with the first counter input gear 51A, and the second counter gear mechanism 5B including the second counter input gear 51B, which meshes with the second input gear 4B, and the second counter output gear 52B, which integrally rotates with the second counter input gear 51B; and
includes the differential gear mechanism 6 including the first differential input gear 7A that meshes with the first counter output gear 52A and the second differential input gear 7B that meshes with the second counter output gear 52B,
wherein at least one of the first differential input gear 7A and the second differential input gear 7B is the outermost gear.

According to this configuration, the driving force of the first rotating electric machine 1A transmitted via the first counter gear mechanism 5A and the driving force of the second rotating electric machine 1B transmitted via the second counter gear mechanism 5B can be appropriately distributed and outputted by the differential gear mechanism 6 to the first output member 2A and the second output member 2B. At least one of the first differential input gear 7A and the second differential input gear 7B is used as the "outermost gear", and as described in detail later, oil that has collected at the bottom of the case CS can be transported toward a suction port 22 and efficiently guided to the suction port 22.

The order of the rotational speeds of the four rotating elements of the planetary gear mechanisms that construct the principal part of the differential gear mechanism 6 is the ring gear R6→the carrier C6→the first sun gear S61→the second sun gear S62. Note that this expression "the order of the rotational speeds" refers to the order of the rotational speeds when the respective rotating elements are in a rotating state. Although the rotational speeds of the respective rotating elements will vary according to the rotational state of the differential gear mechanism 6, the order of magnitude of the rotational speeds of the respective rotating elements is determined by the structure of the differential gear mechanism 6 and is therefore fixed. Note that "the order of the rotational speeds of the rotating elements" is the same as the order in which the rotating elements are disposed in a nomogram chart (also referred to as a "collinear diagram").

The first sun gear S61 is connected via the first connecting shaft 9A to rotate integrally with the second output member 2B. The second sun gear S62 is connected via the second connecting shaft 9B and the second connecting member 8B to rotate integrally with the second differential input gear 7B. The ring gear R6 is connected via the first connecting member 8A to rotate integrally with the first differential input gear 7A. The carrier C6 rotatably supports a first pinion gear P61 and a second pinion gear P62 that rotate integrally. The first pinion gear P61 meshes with the first sun gear S61. The second pinion gear P62 meshes with the second sun gear S62 and also meshes with the ring gear R6. The first pinion gear P61 and the second pinion gear P62 are supported via a pinion shaft P63 in such a manner as to be rotatable with respect to the carrier C6. The carrier C6 is connected to rotate integrally with the first output member 2A.

The planetary gear mechanism that constructs the differential gear mechanism 6 distributes and transmits the driving forces transmitted from the first rotating electric machine 1A and the second rotating electric machine 1B to the first output member 2A and the second output member 2B. The driving force of the first rotating electric machine 1A is inputted via the first input gear 4A and the first counter gear mechanism 5A into the first differential input gear 7A of the differential gear mechanism 6. The driving force of the second rotating electric machine 1B is inputted via the second input gear 4B and the second counter gear mechanism 5B into the second differential input gear 7B of the differential gear mechanism 6. The planetary gear mechanism of the differential gear mechanism 6 distributes and transmits the driving force of the first rotating electric machine 1A inputted into the first differential input gear 7A and the driving force of the second rotating electric machine 1B inputted into the second differential input gear 7B to the first output member 2A and the second output member 2B. By doing so, the torque of the first rotating electric machine 1A and the second rotating electric machine 1B is transmitted to the first wheel W1 connected to the first output member 2A and the second wheel W2 connected to the second output member 2B, thereby causing the vehicle to run.

As depicted in FIG. 2, the case CS in the present embodiment includes a first case section CS1, a second case section CS2, and a third case section CS3. These case sections all have parts exposed to the outer surface of the case CS. The first case section CS1 is disposed in the center in the axial direction L, the second case section CS2 is connected to the axial direction-first side L1 of the first case section CS1, and the third case section CS3 is connected to the axial direction-second side L2 of the third case section CS3. The case CS in the present embodiment is also provided with a first support wall SW1 and a second support wall SW2. These support walls are disposed in an interior of the case CS without being exposed to the outer surface of the case CS. The first support wall SW1 is disposed in a space surrounded by the first case section CS1 and the second case section CS2, and the second support wall SW2 is disposed in a space surrounded by the first case section CS1 and the third case section CS3.

In the present embodiment, the first rotating electric machine 1A is housed in a space on the axial direction-first side L1 of the first support wall SW1 (that is, the space in the axial direction L between the first support wall SW1 and the second case section CS2), which is the space surrounded by the first case section CS1 and the second case section CS2. This space between the first support wall SW1 and the second case section CS2 where the first rotating electric machine 1A is housed is referred to in the present specification as the "first housing space P1". Part of the differential gear mechanism 6 (that is, the planetary gear mechanism that constructs the main part of the differential gear mechanism) is also disposed in the first housing space P1. In the present embodiment, the region in the axial direction L where the first rotating electric machine 1A is disposed and the region in the axial direction L where the differential gear mechanism 6 (in this configuration, the planetary gear mechanism in particular) is disposed overlap.

The second rotating electric machine 1B is housed in a space on the axial direction-second side L2 of the second support wall SW2 (that is, the space in the axial direction L between the second support wall SW2 and the third case section CS3), which is the space surrounded by the first case section CS1 and the third case section CS3. This space between the second support wall SW2 and the third case section CS3 where the second rotating electric machine 1B is housed is referred to in the present specification as the "second housing space P2". The oil pump 20, described later, is also disposed in this second housing space P2. In the present embodiment, the region in the axial direction L where the second rotating electric machine 1B is disposed and the region in the axial direction L where the oil pump 20 is disposed overlap.

In this way, in the present embodiment:
the differential gear mechanism 6 distributes and transmits driving force transmitted from the first rotating electric machine 1A and the second rotating electric machine 1B to the first output member 2A and the second output member 2B;
a region in the axial direction L where the differential gear mechanism 6 is disposed and a region in the axial direction L where the first rotating electric machine 1A is disposed overlap; and
a region in the axial direction L where the oil pump 20 is disposed and a region in the axial direction L where the second rotating electric machine 1B is disposed overlap.

According to this configuration, the differential gear mechanism 6 and the oil pump 20 can be disposed using spaces that are radially outside the first rotating electric machine 1A and the second rotating electric machine 1B. This means that it is possible to suppress increases in size in the axial direction L of the vehicle drive device 100.

In the present embodiment, the first counter gear mechanism 5A and the second counter gear mechanism 5B are housed in the space between the first case section CS1 and the first and second support walls SW1 and SW2 (that is, the space between the first support wall SW1 and the second support wall SW2 in the axial direction L). This space that is located between the first housing space P1, which houses the first rotating electric machine 1A, and the second housing space P2, which houses the second rotating electric machine 1B, and houses the first counter gear mechanism 5A and the second counter gear mechanism 5B is referred to in the present specification as the "third housing space P3". Part of the differential gear mechanism 6 (that is, the first differential input gear 7A and the second differential input gear 7B) is also disposed in this third housing space P3.

The case CS also includes a peripheral wall section 91, a first cover section 92, and a second cover section 93. The peripheral wall section 91 is formed in the shape of a deformed tube that surrounds the first rotating electric machine 1A, the second rotating electric machine 1B, and the differential gear mechanism 6 (see FIG. 3). The first cover section 92 covers an opening at the axial direction-first side L1 of the peripheral wall section 91. The second cover section 93 covers an opening at the axial direction-second side L2 of the peripheral wall section 91.

In the present embodiment, in the direction H, the first axis X1, on which the first rotating electric machine 1A and the second rotating electric machine 1B are disposed, is positioned above and on the width direction-first side H1 of the second axis X2, on which the differential gear mechanism 6 is disposed. As described earlier, for the present embodiment, the width direction-first side H1 is the rear side of the vehicle, and in a state where the vehicle is moving forward, the first output member 2A and the second output member 2B rotate counterclockwise in FIG. 3 (indicated as the "rotational direction when moving forward FW" in the drawing). At such time, the first differential input gear 7A and the second differential input gear 7B, which are the input elements of the differential gear mechanism 6 and located on the outermost periphery, also rotate in the same direction. In this configuration, the first axis X1 is located relative to the second axis X2 in a direction pointed to by the direction of rotation at lower end portions of the first differential input gear 7A and the second differential input gear 7B during forward movement of the vehicle.

The vehicle drive device 100 is equipped with the oil pump 20 for cooling the first rotating electric machine 1A and the second rotating electric machine 1B. As the oil pump 20, it is possible to use an electric oil pump driven by an electric motor, for example. There are no particular limitations on the type of pump, and a gear pump, a vane pump, a screw pump, or the like can be used.

Figure 4:
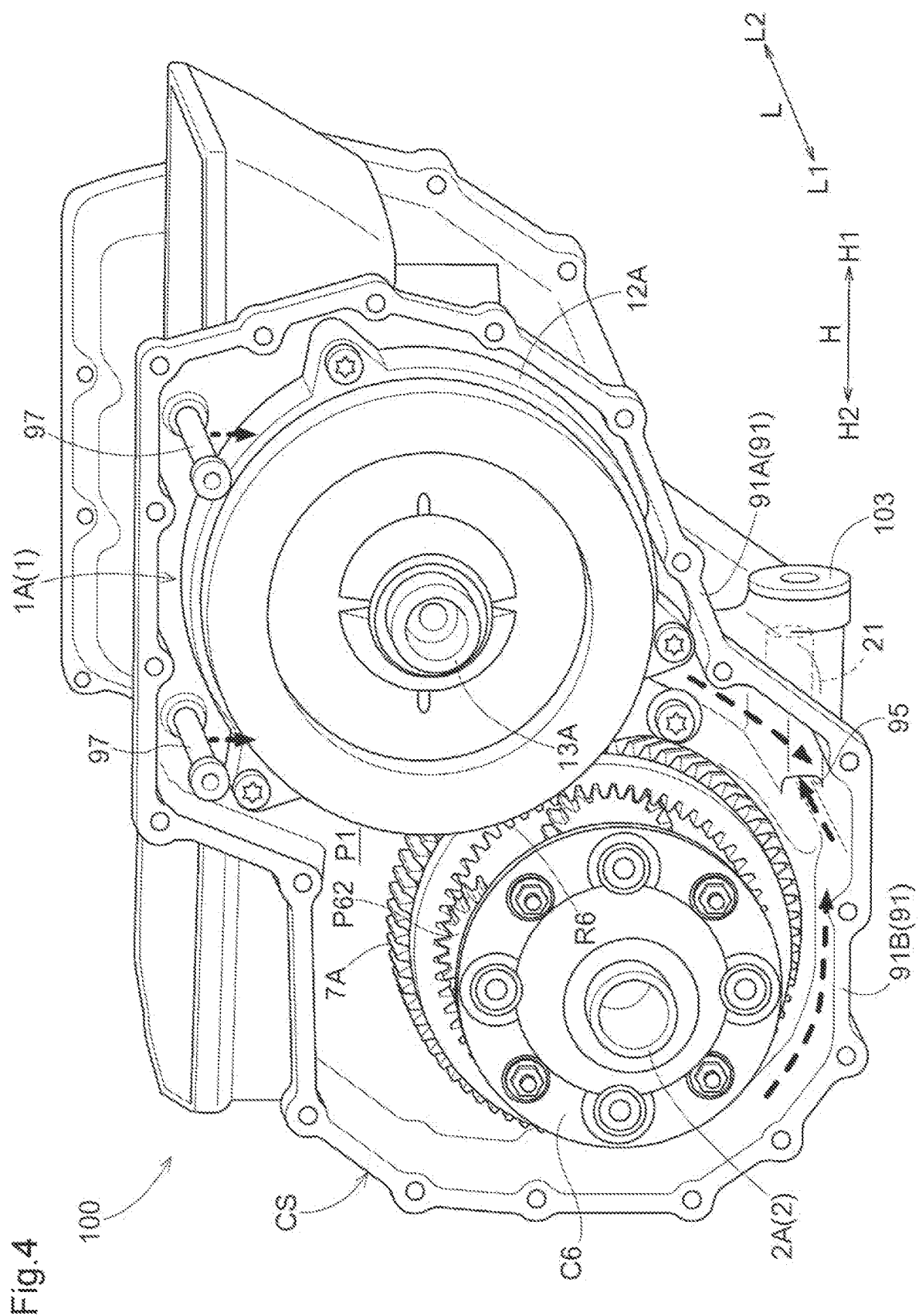
FIG. 4 is a perspective view of a first housing space side of a case interior.

As depicted in FIGS. 3 and 4, the oil pump 20 includes a strainer 21 for removing foreign matter present in the oil. The strainer 21 in the present embodiment is formed in a cylindrical shape, where one end (in the present embodiment, the end portion on the width direction-first side H1) is closed, and the other end (in the present embodiment, the end portion on the width direction-second side H2) is open and communicates with the suction port 22. In the present embodiment, the oil pump 20 is assumed to also include the suction port 22. That is, the oil pump 20 in the present embodiment includes the suction port 22, draws in oil from the suction port 22, and expels the oil that has passed through the strainer 21 to supply oil for cooling purposes to the first rotating electric machine 1A and the second rotating electric machine 1B.

Figure 6:
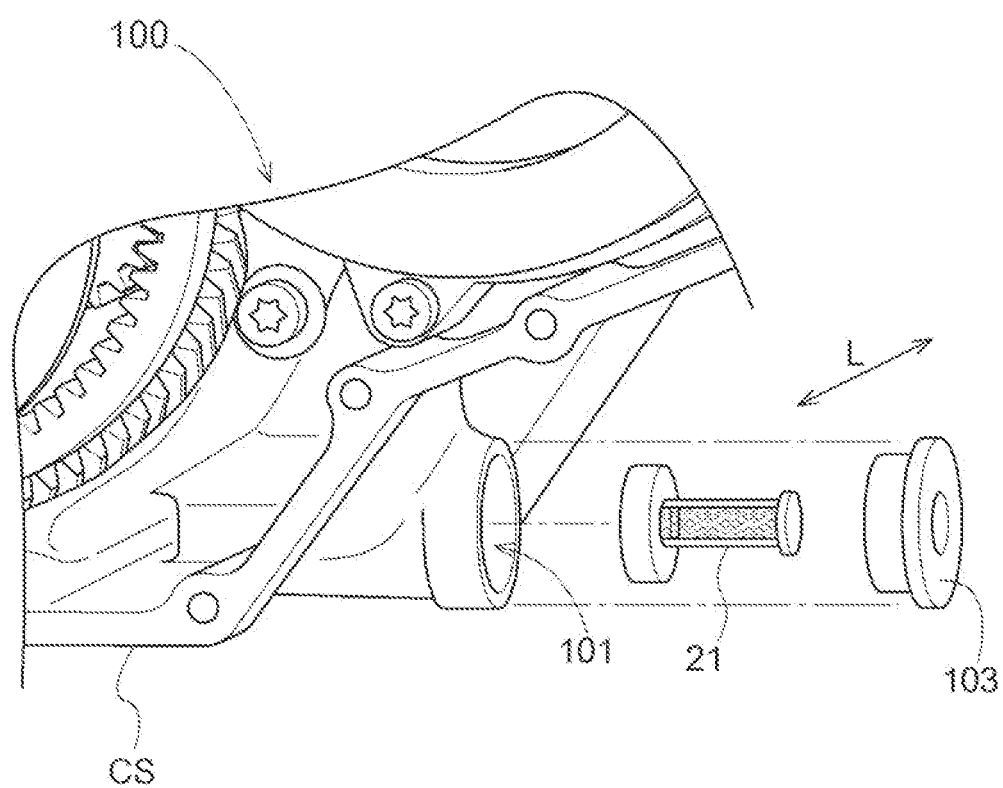
FIG. 6 is an exploded perspective view depicting a mounted state of a strainer.

As depicted in FIG. 6, in the present embodiment, an opening 101 is formed in the case CS (the peripheral wall section 91) in a direction that intersects (perpendicularly in the present embodiment) the axial direction L. The strainer 21 is inserted from this opening 101 and fixed in position. After the strainer 21 has been inserted from the opening 101, the opening 101 is closed using a cap 103.

In this way, in the present embodiment:
the oil pump 20 further includes the strainer 21 for passing the oil that has been drawn in from the suction port 22; and
the strainer 21 is inserted from the opening 101 formed in the case CS in a direction that intersects the axial direction L and then fixed in position.

According to this configuration, the strainer 21 can be mounted from outside the case CS, which facilitates the task of mounting the strainer 21. In addition, the position of the suction port 22 can be set at a lower position compared to a case where the strainer 21 is mounted along the axial direction L inside the case CS. Accordingly it is possible to suppress the production of air bubbles at the oil pump 20 (that is, the drawing in of air by the oil pump 20).

A discharge port of the oil pump 20 is connected to oil supplying sections 97 provided on the upper portion of the case CS. As depicted in FIGS. 3 and 4, the oil supplying sections 97 are provided on the upper portion of the case CS above the first rotating electric machine 1A and the second rotating electric machine 1B. In the present embodiment, two oil supplying sections 97 in a pair are provided for each of the first rotating electric machine 1A and the second rotating electric machine 1B. The oil supplying sections 97 in each pair are disposed on both sides in the width direction H with the first axis X1 in between. Some of the oil expelled from the oil pump 20 drips from the oil supplying sections 97 and is thereby supplied to the first rotating electric machine 1A and the second rotating electric machine 1B. This oil flows down across the surfaces of the first rotating electric machine 1A and the second rotating electric machine 1B, which are cooled by exchanging heat with the oil. The oil that has flowed down across the surfaces of the first rotating electric machine 1A and the second rotating electric machine 1B is then captured by a part of an inner surface of the peripheral wall section 91 that faces the lower surfaces of the rotating electric machines 1A and 1B (this part is hereinafter referred to as the "facing inner surface 91A"; see FIG. 3). The oil received at the facing inner surface 91A then flows down across the facing inner surface 91A to the bottom of the case CS.

In this way the present embodiment:
further includes the oil supplying sections 97 for supplying oil to the rotating electric machines 1; and
has the oil supplying sections 97 provided above the rotating electric machines 1 as pairs of portions split between both sides of the first axis X1 in the width direction H.

According to this configuration, by providing two oil supplying sections 97 for a single rotating electric machine 1, it is easy to increase the supplied amount of oil, which can enhance cooling performance for the rotating electric machines 1. Also, by disposing a pair of oil supplying sections 97 so as to be split between both sides in the width direction (H) with the first axis (X1) in between, it is possible to dispose the pair of oil supplying sections 97 while avoiding the highest point of the rotating electric machines 1, which makes it possible to avoid an increase in the size of the vehicle drive device 100 as a whole.

Note that lubrication of the power transmission mechanism 3 (that is, the first counter gear mechanism 5A, the second counter gear mechanism 5B, and the differential gear mechanism 6) can be achieved by the first differential input gear 7A and the second differential input gear 7B scooping up oil. Oil that has lubricated the respective parts of the power transmission mechanism 3 flows down to the bottom of the case CS.

As depicted in FIG. 2, the suction port 22 of the oil pump 20 (in more detail, the strainer 21) is disposed between the first rotating electric machine 1A and the second rotating electric machine 1B in the axial direction L. In addition, the suction port 22 is disposed between the first differential input gear 7A and the second differential input gear 7B in the axial direction L in the third housing space P3 that houses the first differential input gear 7A and the second differential input gear 7B. The suction port 22 is disposed in the center in the axial direction L of the vehicle drive device 100. The suction port 22 is provided with an opening that faces the width direction H (see FIGS. 3 and 4).

Figure 5:
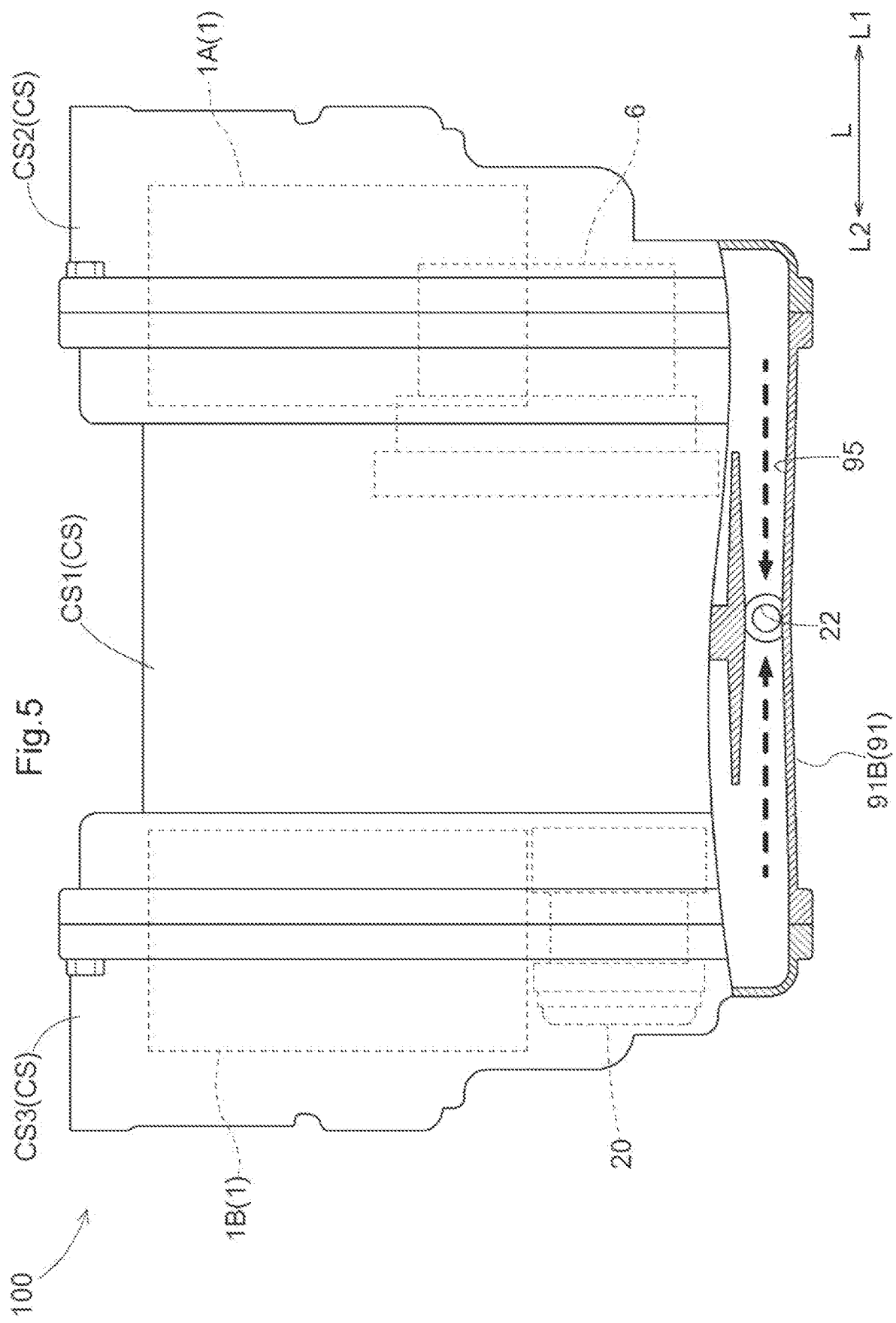
FIG. 5 is a partially cutaway front view of a vehicle drive device.

As depicted in FIGS. 2 and 5, in the present embodiment, a communication path 95 is formed in the case CS in such a manner as to communicate with the suction port 22. At the bottom of the case CS, the communication path 95 is formed in a straight line along the axial direction L in such a manner as to communicate with the first housing space P1, in which the first rotating electric machine 1A is housed, and the second housing space P2, in which the second rotating electric machine 1B is housed. With this configuration, the suction port 22 is disposed in the third housing space P3 in a state where the suction port 22 communicates with both the first housing space P1 and the second housing space P2. Since the suction port 22 communicates with both the first housing space P1 and the second housing space P2, it is possible to guide both oil that has cooled the first rotating electric machine 1A and oil that has cooled the second rotating electric machine 1B to the suction port 22.

In this way, in the present embodiment:
the case CS forms a first housing space P1 in which the first rotating electric machine 1A is housed in the axial direction L, a second housing space P2 in which the second rotating electric machine 1B is housed in the axial direction L, and a third housing space P3 that is provided between the first housing space P1 and a second housing space P2 in the axial direction L and in which at least part of the power transmission mechanism 3 is disposed; and
the suction port 22 is disposed in the third housing space P3 in a state where the suction port 22 communicates with both the first housing space P1 and the second housing space P2.

According to this configuration, it is possible to guide both oil that has cooled the first rotating electric machine 1A and oil that has cooled the second rotating electric machine 1B to the suction port 22.

As depicted in FIGS. 3 and 4, the communication path 95 and the suction port 22 that communicates with the communication path 95 are disposed so as to be below the second axis X2 where the differential gear mechanism 6 is disposed in the vertical direction. The communication path 95 and the suction port 22 are disposed further below the first differential input gear 7A and the second differential input gear 7B, which are the outermost gears of the differential gear mechanism 6. The communication path 95 and the suction port 22 are disposed upwardly adjacent to a bottom surface of the peripheral wall section 91 of the case CS. Here, the communication path 95 and the suction port 22 are disposed at positions directly above a lowest part of the bottom surface of the peripheral wall section 91 of the case CS. This means that oil that has collected at the bottom of the peripheral wall section 91 of the case CS can be guided to the suction port 22 via the communication path 95.

The communication path 95 and the suction port 22 that communicates with the communication path 95 are disposed in the width direction H between the first axis X1, on which the first rotating electric machine 1A and the second rotating electric machine 1B are disposed, and the second axis X2, on which the differential gear mechanism 6 is disposed. In the region in the width direction H where the differential gear mechanism 6 is disposed, the communication path 95 and the suction port 22 are disposed adjacent on the width direction-first side H1 to a lower end portion of the first differential input gear 7A. As described earlier, the width direction-first side H1 is the side in the width direction H where the first axis X1 (the first rotating electric machine 1A and the second rotating electric machine 1B) is disposed, and this side where the first axis X1 is disposed matches the direction pointed to by the rotational direction when moving forward FW of the lower end portion of the first differential input gear 7A. Accordingly when the vehicle is moving forward, the oil that has collected in the bottom portion of the case CS can be efficiently guided to the suction port 22 by the rotation of the first differential input gear 7A.

In this way in the present embodiment
in an axial direction L view, the suction port 22 is disposed adjacent in the width direction H to the lower end portion of the first differential input gear 7A and is upwardly adjacent to the bottom surface of the peripheral wall section 91.

According to this configuration, when the vehicle is moving forward, oil that has collected in the bottom portion of the case CS can be efficiently guided to the suction port 22 by the rotation of the first differential input gear 7A.

In the present embodiment, the facing inner surface 91A that faces the lower surfaces of the rotating electric machines 1A and 1B is inclined downward in the width direction H toward the communication path 95 and the suction port 22. This means that oil received by the facing inner surface 91A after cooling the first rotating electric machine 1A and the second rotating electric machine 1B can be efficiently guided to the suction port 22 using the inclination of the facing inner surface 91A.

In this way the vehicle drive device 100 according to the present embodiment includes:
the rotating electric machines 1 that are disposed on the first axis X1;
the output members 2 that are disposed on the second axis X2, which differs from the first axis X1, and are in driving connection with the wheels W;
the power transmission mechanism 3 for transmitting torque of the rotating electric machines 1 to the output members 2;
the case CS that houses the rotating electric machines 1 and the power transmission mechanism 3; and
an oil pump 20 that includes a suction port 22, expels oil drawn in from the suction port 22, and supplies oil for cooling to the rotating electric machines 1,
wherein the power transmission mechanism 3 includes the differential gear mechanism 6 disposed on the second axis X2,
the case CS includes the peripheral wall section 91 that surrounds the rotating electric machines 1 and the differential gear mechanism 6,
a direction that is parallel to the first axis X1 and the second axis X2 is set as the "axial direction L", a direction that is perpendicular to the vertical direction in an axial direction L view along the axial direction L when the vehicle drive device has been mounted in a vehicle is set as the "width direction H", and a gear disposed in an outermost periphery of the differential gear mechanism 6 is set as an "outermost gear", in the width direction H, the first axis X1 is disposed relative to the second axis X2 in the direction in which the direction of rotation at the lower end portion of the first differential input gear 7A points when the vehicle is moving forward, the suction port 22 is disposed below the second axis X2 and between the first axis X1 and the second axis X2 in the width direction H; and the part (or facing inner surface 91A) of the inner surface of the peripheral wall section 91 that faces the lower surfaces of the rotating electric machines 1 is downwardly inclined in the width direction H toward the suction port 22.

According to this configuration, since the first axis X1 is disposed in the direction in which the direction of rotation at the lower end portion of the first differential input gear 7A, which is disposed on the second axis X2, points during forward movement of the vehicle and the suction port 22 is disposed between the first axis X1 and the second axis X2, it is possible to transport oil using the rotating first differential input gear 7A and efficiently collect oil at the suction port 22. In addition, since an inner surface portion of the peripheral wall section 91 facing the lower surface of the rotating electric machine 1 is inclined downward toward the suction port 22 side, oil that has cooled the rotating electric machines 1 is received at the inner surface of the peripheral wall section 91 and can flow further downward toward the suction port 22. By drawing in both the oil transported by the first differential input gear 7A on the second axis X2 and the oil that has flowed down from the rotating electric machine 1 side on the first axis X1 from the suction port 22, it is possible to supply a sufficient amount of oil to the oil pump 20. Accordingly it is possible to effectively suppress the production of air bubbles at the oil pump 20.

In addition, in the present embodiment, the communication path 95 that communicates with the suction port 22 is disposed in a region of confluence of the flow of oil toward the width direction-first side H1 produced by rotation of the first differential input gear 7A and the flow of oil toward the width direction-second side H2 that flows down across the facing inner surface 91A. Accordingly, it is possible to efficiently transport more oil to the communication path 95 and in turn guide the oil to the suction port 22. Accordingly a sufficient amount of oil can be supplied to the oil pump 20 via the strainer 21, and the production of air bubbles at the oil pump 20 can be effectively suppressed. In particular, it will be possible to effectively suppress the generation of bubbles at the oil pump 20 even if the oil level at the bottom of the case CS tilts as the vehicle accelerates, decelerates, or turns.

Second Embodiment

Figure 7:
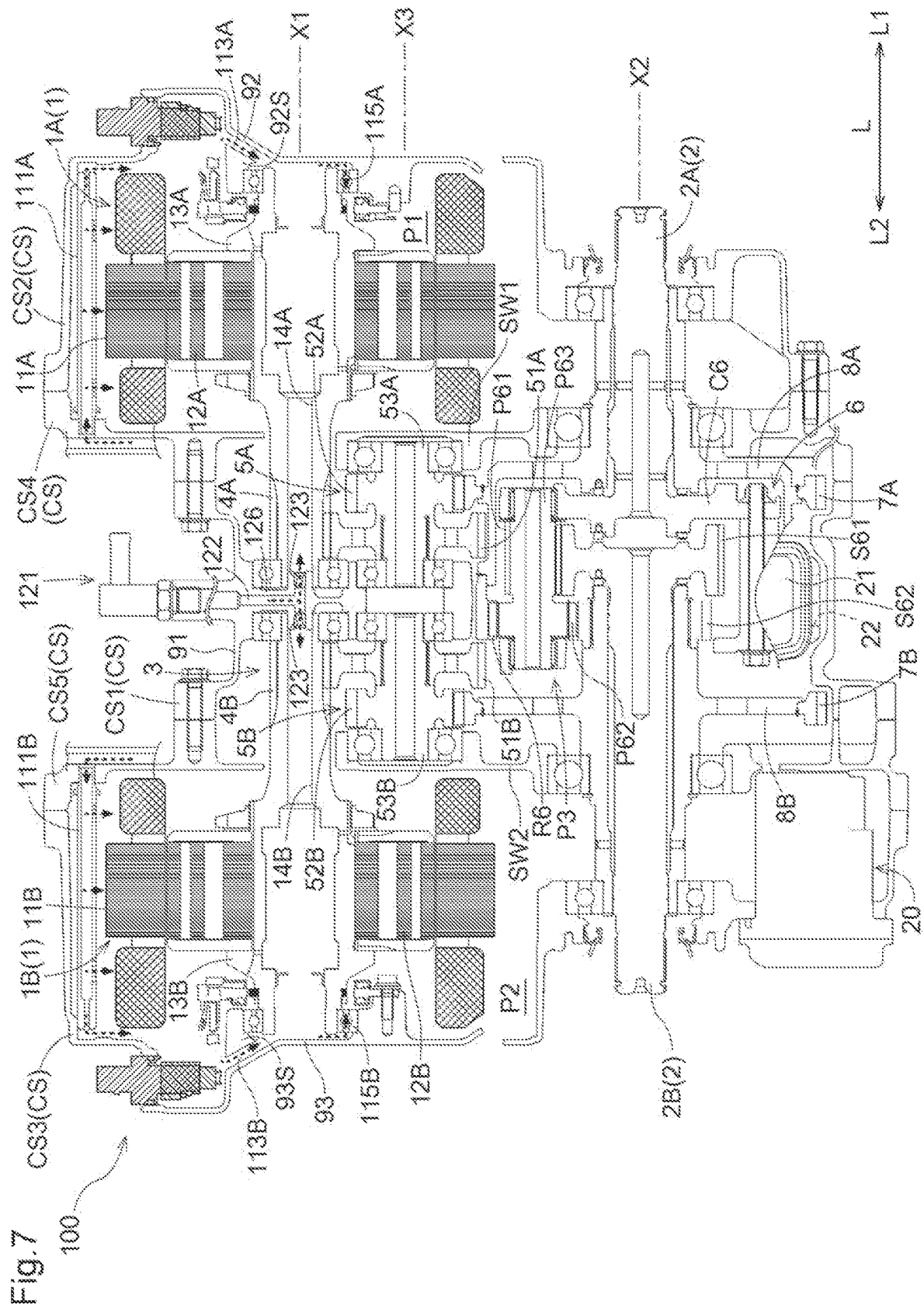
FIG. 7 is a cross-sectional view of a vehicle drive device according to a second embodiment.

A second embodiment of a vehicle drive device will now be described with reference to the drawings. As depicted in FIG. 7, the configuration of the vehicle drive device 100 according to the present embodiment is mostly the same as the configuration of the vehicle drive device 100 according to the first embodiment described above (see FIG. 2), but there are some differences in the detailed configuration. The vehicle drive device 100 according to the present embodiment is described below focusing on the differences from the first embodiment. Note that features and configurations that are not particularly described are the same as those in the first embodiment, the same reference numerals have been assigned, and detailed description has been omitted.

As depicted in FIG. 7, the case CS in the present embodiment includes a fourth case section CS4 and a fifth case section CS5, in addition to the first case section CS1, the second case section CS2, and the third case section CS3. These case sections all have parts exposed to the outer surface of the case CS. The first case section CS1 is disposed in the center in the axial direction L. The fourth case section CS4 is connected to the axial direction-first side L1 of the first case section CS1, and the second case section CS2 is connected to the axial direction-first side L1 of the fourth case section CS4. The fifth case section CS5 is connected to the axial direction-second side L2 of the first case section CS1, and the third case section CS3 is connected to the axial direction-second side L2 of the fifth case section CS5.

The case CS is also equipped with the first support wall SW1 and the second support wall SW2. These support walls are disposed in an interior of the case CS without being exposed to the outer surface of the case CS. The first support wall SW1 is formed on the fourth case section CS4 and the second support wall SW2 is formed on the fifth case section CS5.

In the present embodiment, the first rotating electric machine 1A is housed in a space on the axial direction-first side L1 of the first support wall SW1 (that is, the first housing space P1 between the first support wall SW1 and the second case section CS2 in the axial direction L), which is a space surrounded by the fourth case section CS4 and the second case section CS2. The second rotating electric machine 1B is housed in a space on the axial direction-second side L2 of the second support wall SW2 (that is, the second housing space P2 between the second support wall SW2 and the third case section CS3 in the axial direction L), which is a space surrounded by the fifth case section CS5 and the third case section CS3. The oil pump 20 is disposed in this second housing space P2. Note that the oil pump 20 is fixed in such a manner as to be inserted through the third case section CS3 (the second cover section 93) in the axial direction L. The region in the axial direction L where the second rotating electric machine 1B is disposed and the region in the axial direction L where the oil pump 20 is disposed overlap.

In the present embodiment, the first counter gear mechanism 5A, the second counter gear mechanism 5B, and the differential gear mechanism 6 are housed in a space between the first, fourth, and the fifth case sections CS1, CS4, and CS5, and the first and second support walls SW1 and SW2 (that is, in the third housing space P3 between the first and second support walls SW1 and SW2 in the axial direction L). In the present embodiment, the differential gear mechanism 6 is entirely housed in the third housing space P3.

The vehicle drive device 100 according to the present embodiment is equipped with a first oil supplying section 111A and a second oil supplying section 111B corresponding to the "oil supplying sections 97" in the first embodiment described earlier. The first oil supplying section 111A and the second oil supplying section 111B are configured to individually supply oil to the first rotating electric machine 1A and the second rotating electric machine 1B.

The first oil supplying section 111A is provided above the first rotating electric machine 1A in the first housing space P1, and supplies oil from above to the first rotating electric machine 1A. In the present embodiment, the first oil supplying section 111A is provided above the highest point of the first rotating electric machine 1A. The first oil supplying section 111A extends from the fourth case section CS4 along the axial direction L to the vicinity of the first cover section 92. Oil flows down along the first cover section 92 from an end portion on the axial direction-first side L1 of the first oil supplying section 111A.

The second oil supplying section 111B is provided above the second rotating electric machine 1B in the second housing space P2, and supplies oil from above to the second rotating electric machine 1B. In the present embodiment, the second oil supplying section 111B is provided above a highest point of the second rotating electric machine 1B. The second oil supplying section 111B extends from the fifth case section CS5 along the axial direction L to the vicinity of the second cover section 93. Oil flows down along the second cover section 93 from an end portion on the axial direction-second side L2 of the second oil supplying section 111B.

In the present embodiment, a first bearing oil supplying path 113A that extends in at least the radial direction is formed in a support section (or "first tubular section 92S") of the first cover section 92 that supports the first rotor shaft 13A. The first bearing oil supplying path 113A is formed so as to be downwardly inclined from a highest point of the first tubular section 92S toward the axial direction-second side L2. Oil that has been supplied from the end portion on the axial direction-first side L1 of the first oil supplying section 111A and has flowed down across the first cover section 92 passes through the first bearing oil supplying path 113A and is supplied to a bearing 115A that rotatably supports the first rotor shaft 13A.

A second bearing oil supplying path 113B that extends in at least the radial direction is formed in a support section (or "second tubular section 93S") of the second cover section 93 that supports the second rotor shaft 13B. The second bearing oil supplying path 113B is formed in such a manner as to be downwardly inclined from a highest point of the second tubular section 93S toward the axial direction-first side L1. Oil that has been supplied from an end portion on the axial direction-second side L2 of the second oil supplying section 111B and has flowed down across the second cover section 93 passes through the second bearing oil supplying path 113B and is supplied to a bearing 115B that rotatably supports the second rotor shaft 13B.

In the present embodiment, the first cover section 92 and the second cover section 93 each correspond to an "end wall section" for the present disclosure. The bearings 115A and 115B each correspond to a "rotor bearing" for the present disclosure. The first bearing oil supplying path 113A and the second bearing oil supplying path 113B each correspond to a "bearing oil supplying path" for the present disclosure.

In this way, in the present embodiment:
the case CS includes the first cover section 92 and the second cover section 93, which each cover one end in the axial direction L;
the rotor shafts 13A and 13B that are connected to the rotors 12A and 12B of the rotating electric machines 1A and 1B are rotatably supported on the first cover section 92 and the second cover section 93 via the bearings 115A and 115B; and
the bearing oil supplying paths 113A and 113B for supplying oil to the bearings 115A and 115B are formed along the first cover section 92 and the second cover section 93, respectively.

According to this configuration, oil that has flowed down along the first cover section 92 and the second cover section 93 can be supplied to the bearings 115A and 115B through the bearing oil supplying paths 113A and 113B. Accordingly the bearings 115A and 115B that rotatably support the rotor shafts 13A and 13B can be properly lubricated.

The vehicle drive device 100 according to the present embodiment is equipped with a third oil supplying section 121 for supplying oil to the rotating electric machine 1, in addition to the first oil supplying section 111A and the second oil supplying section 111B. The third oil supplying section 121 is configured to supply oil expelled from the oil pump 20 to an upper portion of the first case section CS1 via the outside of the case CS. The third oil supplying section 121 is connected to a shared oil supplying path 122 formed in the case CS (specifically the first case section CS1). In the present embodiment, the shared oil supplying path 122 is formed in a central supporting wall section 126 that radially extends above the first case section CS1.

The shared oil supplying path 122 extends radially to the position of the first axis X1 and branches into a T shape at that position. One of the branched ends communicates with a first shaft internal oil path 14A formed inside the first rotor shaft 13A, and the other branched end communicates with a second shaft internal oil path 14B formed inside the second rotor shaft 13B. In the present embodiment, plugs 123 are disposed at a portion of the common oil supplying path 122 that connects to the first rotor shaft 13A and a portion of the common oil supplying path 122 that connects to the second rotor shaft 13B. The plugs 123 have oil spray holes whose oil paths are set with a narrower cross-sectional area than the shared oil supplying path 122 and adjust the flow rates of oil supplied from the shared oil supplying path 122 to the first shaft internal oil path 14A and the second shaft internal oil path 14B.

In this way, in the present embodiment:
the first rotating electric machine 1A that includes the first rotor 12A and the second rotating electric machine 1B that includes the second rotor 12B are provided as the rotating electric machines 1; and
the shared oil supplying path 122, which supplies oil to the inside of the hollow first rotor shaft 13A connected to the first rotor 12A and to the inside of the hollow second rotor shaft 13B connected to the second rotor 12B, is provided between the first rotating electric machine 1A and the second rotating electric machine 1B in the axial direction L of the case CS.

According to this configuration, it is possible to reduce the size in the axial direction L of the entire vehicle drive device 100 compared to a configuration where an oil path for supplying oil to the inside of the first rotor shaft 13A and an oil path for supplying oil to the inside of the second rotor shaft 13B are separately provided at different positions in the axial direction.

The plugs 123 for adjusting the flow rate of oil are disposed at the portions of the shared oil supplying path 122 that are connected to the first rotor shaft 13A and the second rotor shaft 13B.

According to this configuration, the plugs 123 can adjust the flow rates of oil flowing from the shared oil supplying path 122 to the inside of the first rotor shaft 13A and the inside of the second rotor shaft 13B. Accordingly, when the first rotor 12A and the second rotor 12B are cooled using the oil flowing inside the first rotor shaft 13A and the second rotor shaft 13B for example, the cooling performance can be improved while suppressing the amount of oil expelled from the oil pump 20 to a small amount, which raises efficiency.

Figure 8:
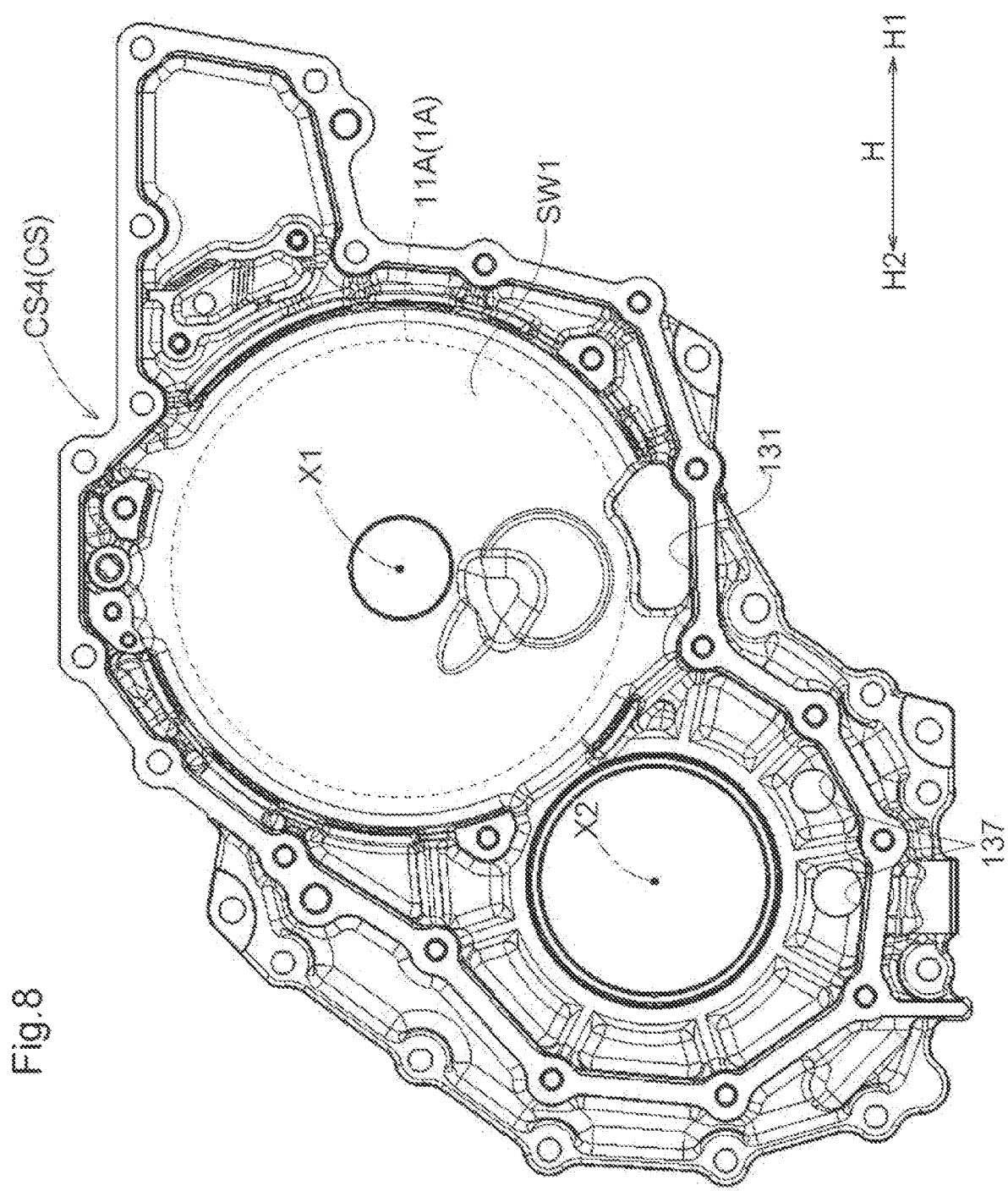
FIG. 8 is a view of a first support wall as viewed in the axial direction.

As depicted in FIG. 8, a communication hole 131 is formed in such a manner as to pass through the first support wall SW1 in the axial direction L. The communication hole 131 is formed below the first axis X1 and near a lower end of the first stator 11A of the first rotating electric machine 1A (the outer edge of the first stator 11A is indicated by a virtual line in FIG. 8). The communication hole 131 communicates between the first housing space P1, in which the first rotating electric machine 1A is housed, and the third housing space P3, in which the first counter gear mechanism 5A, the second counter gear mechanism 5B, and the differential gear mechanism 6 are housed. In the present embodiment, the first support wall SW1 corresponds to a "support wall" for the present disclosure.

Figure 9:
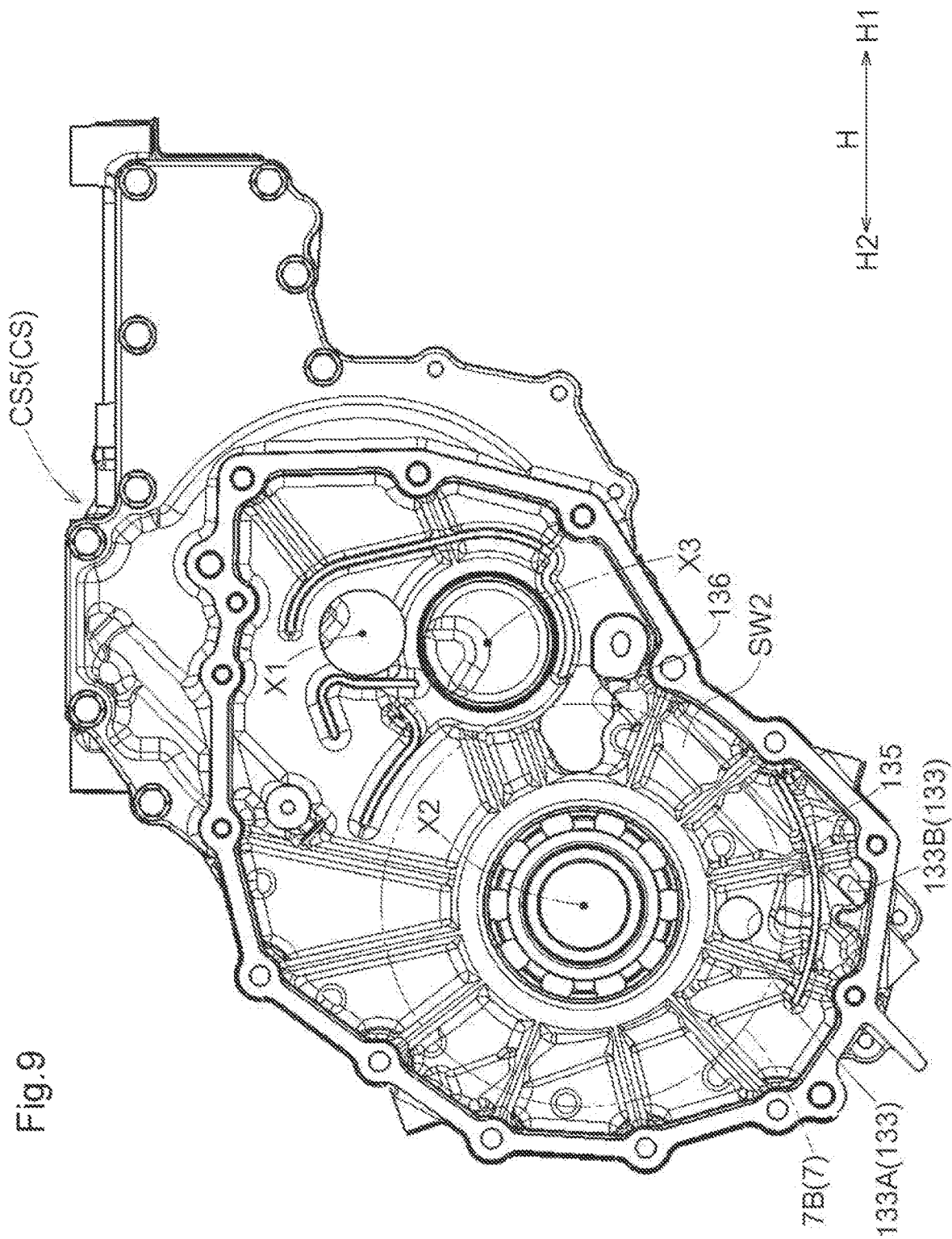
FIG. 9 is a view of a second support wall as viewed in the axial direction.

As depicted in FIG. 9, a similar communication hole 136 is also formed in the second support wall SW2. The communication hole 136 communicates between the second housing space P2, in which the second rotating electric machine 1B, and the third housing space P3, in which the first counter gear mechanism 5A, the second counter gear mechanism 5B, and the differential gear mechanism 6 are housed.

In the present embodiment, an oil return hole 133 that passes through in the axial direction L is formed in the second support wall SW2 separately from the communication hole 136. The oil return hole 133 is formed below the second axis X2. In the present embodiment, as the oil return hole 133, an inner oil return hole 133A and an outer oil return hole 133B, which is formed at a position further below the inner oil return hole 133A, are formed. In the present embodiment, the inner oil return hole 133A is larger than the outer oil return hole 133B. The inner oil return hole 133A is disposed radially inward of the second differential input gear 7B (whose tip circle is indicated by a virtual line in FIG. 9), which is the outermost gear of the differential gear mechanism 6. The outer oil return hole 133B is disposed radially outward of the second differential input gear 7B. A shield rib 135 that extends in the circumferential direction of the second axis X2 is formed between the second differential input gear 7B and the outer oil return hole 133B in the radial direction.

Note that in FIG. 8, oil return holes 137, which are similar to the inner oil return hole 133A, are also formed in the first support wall SW1. Two oil return holes 137 are formed in the first support wall SW1. On the other hand, elements that correspond to the outer oil return hole 133B and the shield rib 135 are not provided on the first support wall SW1.

In this way in the present embodiment:
the case CS forms at least the first housing space P1, in which the first rotating electric machine 1A is housed, and the third housing space P3, in which at least part of the power transmission mechanism 3 is disposed, and includes the first support wall SW1 that forms that partitions the first housing space P1 and the third housing space P3 in the axial direction L; and
a communication hole 131 that communicates between the first housing space P1 and the third housing space P3 is formed in the first support wall SW1.

According to this configuration, oil for purposes such as cooling the first rotating electric machine 1A in the first housing space P1 can be smoothly discharged through the communication hole 131 to the third housing space P3. Accordingly it is possible to avoid oil stagnating in the first housing space P1.

The oil return hole 133 for returning oil from the first housing space P1 to the third housing space P3 is formed in the first support wall SW1 separately from the communication hole 131.

The oil return hole 133 (or "inner oil return hole 133A") is disposed radially inward of the first differential input gear 7A.

According to this configuration, oil for purposes such as cooling the first rotating electric machine 1A in the first housing space P1 can be smoothly discharged to the third housing space P3 through the oil return hole 133 separately to the communication hole 131. Here, since the oil return hole 133 is disposed radially inward of the first differential input gear 7A, the oil that has been scooped up by the first differential input gear 7A is unlikely to produce a backflow. Accordingly for these reasons also, it is possible to more reliably avoid oil stagnating in the first housing space P1.

The case CS includes the second support wall SW2 that forms at least the second housing space P2, in which the second rotating electric machine 1B is housed, and the third housing space P3, in which at least part of the power transmission mechanism 3 is disposed, and partitions the second housing space P2 and a third housing space P3 in the axial direction L.

The communication hole 136 that communicates between the second housing space P2 and the third housing space P3 is formed in the second support wall SW2.

According to this configuration, oil for purposes such as cooling the second rotating electric machine 1B in the second housing space P2 can be smoothly discharged through the communication hole 136 to the third housing space P3. Accordingly it is possible to avoid oil stagnating in the second housing space P2.

The oil return hole 137 for returning oil from the second housing space P2 to the third housing space P3 is formed in the second support wall SW2 separately from the communication hole 136.

The oil return hole 137 is disposed radially inward of the second differential input gear 7B.

According to this configuration, oil for purposes such as cooling the second rotating electric machine 1B in the second housing space P2 can be smoothly discharged to the third housing space P3 from the oil return hole 137 separately to the communication hole 136. Here, since the oil return hole 137 is disposed radially inward of the second differential input gear 7B, the oil that has been scooped up by the second differential input gear 7B is unlikely to produce a backflow. Accordingly for these reasons also, it is possible to more reliably avoid oil stagnating in the second housing space P2.

Figure 10:
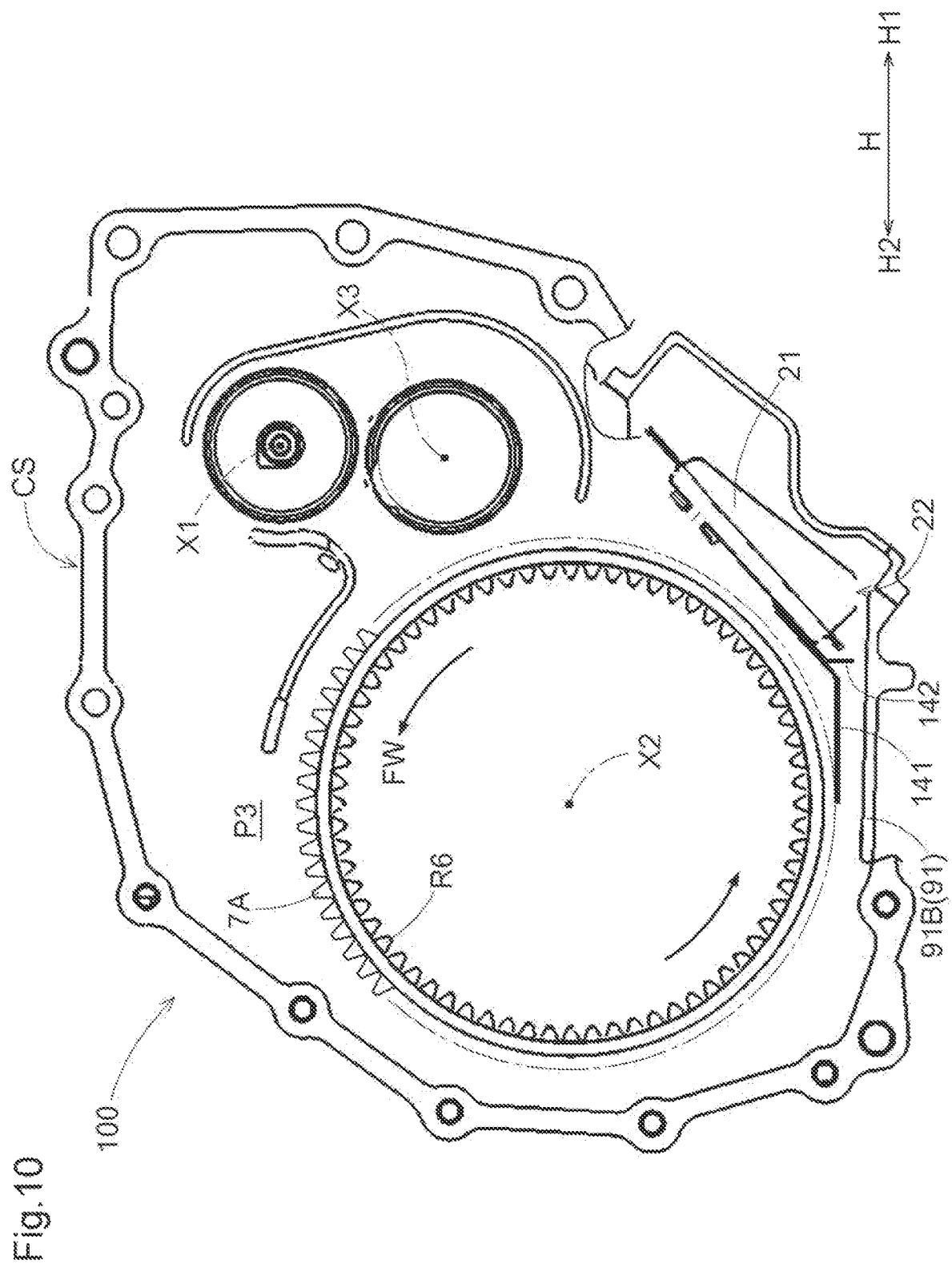
FIG. 10 is a side view of a third housing space side of a case interior.

As depicted in FIG. 10, in the present embodiment, the strainer 21 that is in the shape of a flat box is housed in the third housing space P3. The strainer 21 is disposed below the second axis X2 and between the second axis X2 and the first axis X1 in the width direction H. The strainer 21 is disposed in an inclined posture that is downwardly inclined toward the width direction-second side H2. The suction port 22 is provided at the lowest part of the strainer 21, which is installed in this inclined posture, in such a manner as to be open at the bottom. In the present embodiment, when the vehicle is traveling forward, the oil that has collected in the bottom of the case CS can be efficiently guided to the suction port 22 by the rotation of the first differential input gear 7A.

In the present embodiment, a first plate 141 is disposed between the lower end portion of the first differential input gear 7A and the suction port 22 in the width direction H. The first plate 141 is disposed in such a manner as to extend along a tangential direction (which substantially matches the width direction H) at the lower end portion of the first differential input gear 7A. The first plate 141 is fixed so that the end portion on the width direction-first side H1 is bent upward, and this bent portion extends along an upper surface of the strainer 21.

In addition, in the present embodiment, a second plate 142 that differs from the first plate 141 is disposed between the lower end portion of the first differential input gear 7A and the suction port 22 in the width direction H. The second plate 142 is disposed in such a manner as to extend in a direction that intersects (in this example, substantially perpendicularly) the flow of oil caused by the rotation of the first differential input gear 7A. In the present embodiment, the second plate 142 is fixed to the first plate 141 in such a manner as to extend downward from the first plate 141.

In this way in the present embodiment
the first plate 141 that extends along the tangential direction at the lower end portion of the first differential input gear 7A is disposed between the lower end portion of the first differential input gear 7A and the suction port 22 in the width direction H.

According to this configuration, oil that has been scooped up by the first differential input gear 7A when the vehicle is moving forward can be guided along the first plate 141 to the suction port 22. In particular, it is possible to prevent oil from escaping through a gap in the radial direction between the differential gear mechanism 6 and the strainer 21 and efficiently guide the oil to the suction port 22.

The second plate 142, which extends in a direction that intersects the flow of oil accompanying rotation of the first differential input gear 7A, is also disposed between the lower end of the first differential input gear 7A and the suction port 22 in the width direction H.

According to this configuration, by partially blocking the flow of oil scooped up by the first differential input gear 7A with the second plate 142, it is possible to reduce the flow velocity of the oil. As a result, the oil will stay in the vicinity of the suction port 22 for a long time, which makes it possible to effectively prevent the production of air bubbles at the oil pump 20.

Other Embodiments (1) In each of the embodiments described above, example configurations are described where the suction port 22 is disposed in such a manner as to be adjacent in the width direction H to the lower end of the first differential input gear 7A in an axial direction view, and upwardly adjacent to the bottom surface of the peripheral wall section 91. However, the present disclosure is not limited to this configuration, and the suction port 22 may be disposed at a spacing in the width direction H from the lower end portion of the first differential input gear 7A in an axial direction view. In addition, the suction port 22 may be disposed in such a manner as to be upwardly separated from the bottom surface of the peripheral wall section 91. Alternatively, the suction port 22 may be disposed at a spacing in the width direction H from the lower end portion of the first differential input gear 7A in an axial direction view and in such a manner as to be upwardly separated from the bottom surface of the peripheral wall section 91.

(2) In each of the above embodiments, example configurations have been described where the first differential input gear 7A and the second differential input gear 7B are formed with the same diameter. However, the present disclosure is not limited to such configurations and it is possible to form the first differential input gear 7A and the second differential input gear 7B with different diameters, such as by forming the first differential input gear 7A with a larger diameter than the second differential input gear 7B. It should be obvious that this size relationship between the first differential input gear 7A and the second differential input gear 7B may also be reversed. In this case, of the first differential input gear 7A and the second differential input gear 7B, the one with the larger diameter corresponds to the "outermost peripheral gear".

(3) In the first embodiment described above, an example configuration has been described where the region where the differential gear mechanism 6 is disposed and the region where the first rotating electric machine 1A is disposed overlap in the axial direction L, and the region where the oil pump 20 is disposed and the region where the second rotating electric machine 1B is disposed overlap. However, the present disclosure is not limited to this configuration and it is also possible for the region where the differential gear mechanism 6 is disposed and the region where the first rotating electric machine 1A is disposed to be displaced in the axial direction L, as in the second embodiment described above for example. The region where the oil pump 20 is disposed and the region where the second rotating electric machine 1B is disposed may also be displaced in the axial direction L. Alternatively the region where the differential gear mechanism 6 is disposed and the region where the first rotating electric machine 1A is disposed may be displaced in the axial direction L and the region where the oil pump 20 is disposed and the region where the second rotating electric machine 1B is disposed may be displaced in the axial direction L.

(4) In the first embodiment described above, an example configuration where the suction port 22 and the communication path 95 that communicates with the suction port 22 communicate with both the first housing space P1 and the second housing space P2 has been described. However, the present disclosure is not limited to this configuration and the suction port 22 and the communication path 95 may communicate with only one of the first housing space P1 and the second housing space P2. In this case, a bypass flow path that communicates between the first housing space P1 and the second housing space P2 may be formed in the case CS separately to the communication path 95.

(5) The above embodiments describe example configurations that include the first rotating electric machine 1A and the second rotating electric machine 1B as the rotating electric machines 1 and have the differential gear mechanism 6 distribute and transmit driving forces transmitted from the first rotating electric machine 1A and the second rotating electric machine 1B to the first output member 2A and the second output member 2B. However, the present disclosure is not limited to this configuration and it is also possible to include only one rotating electric machine 1 and have the differential gear mechanism 6 distribute and transmit the driving force transmitted from this rotating electric machine 1 to the first output member 2A and the second output member 2B. In this case, as the differential gear mechanism 6, it is possible to use a configuration including a pair of bevel gears that mesh with each other.

Alternatively the vehicle drive device 100 may be configured to include only one output member 2 that is in driving connection with a wheel W and not include the differential gear mechanism 6 described above. In this case, the "output gear mechanism" disposed on the second axis X2, which is coaxial with the output member 2, can be constructed for example of a single gear that meshes with the first counter output gear 52A and rotates in conjunction with the output member 2. In this case, this single gear corresponds to the "outermost gear" for the present disclosure. This configuration is suited to a configuration where one wheel W is driven by one vehicle drive device 100, such as an in-wheel motor drive device.

(6) Note that the configurations disclosed in each of the above embodiments (which includes the first, second and other embodiments given above) can be combined with the configurations disclosed in other embodiments as appropriate so long as there is no conflict between them. Such other configurations are exemplary in all respects of the embodiments disclosed in this specification. This means that various modifications can be made as appropriate without departing from the scope of the present disclosure.

Overview of Embodiments

To summarize, a vehicle drive device (100) according to the present disclosure preferably has the configurations described below.

A vehicle drive device (100) includes:
- a rotating electric machine (1) disposed on a first axis (X1);
- an output member (2) disposed on a second axis (X2), which differs from the first axis (X1), and in driving connection with a wheel (W);
- a power transmission mechanism (3) configured to transmit torque of the rotating electric machine (1) to the output member (2);
- a case (CS) configured to house the rotating electric machine (1) and the power transmission mechanism (3); and
- an oil pump (20) including a suction port (22), and configured to expel oil drawn in from the suction port (22), and to supply oil for cooling to the rotating electric machine (1),
- wherein the power transmission mechanism (3) includes an output gear mechanism (6) disposed on the second axis (X2),
- the case (CS) includes a peripheral wall section (91) surrounding the rotating electric machine (1) and the output gear mechanism (6),
- with (i) a direction parallel to the first axis (X1) and the second axis (X2) being an axial direction (L), (ii) a direction perpendicular to a vertical direction in an axial direction view along the axial direction (L) in a state where the vehicle drive device has been mounted in a vehicle being (ii) a width direction (H), and (iii) a gear disposed in an outermost periphery of the output gear mechanism (6) being an outermost gear (7A/8A),
- the second axis (X2) is disposed below the first axis (X1),
- the suction port (22) is disposed between the first axis (X1) and the second axis (X2) in the width direction (H), and is disposed below the first axis (X1) and the second axis (X2) in the vertical direction,
- the outermost gear (7A/8A) is disposed so that a direction of rotation at a lower end portion of the outermost gear (7A/8A) while the vehicle is moving forward points toward the suction port (22) in the width direction (H), and
- a portion of an inner surface of the peripheral wall section (91) facing a lower surface of the rotating electric machine (1) is downwardly inclined in the width direction (H) toward the suction port (22).

According to this configuration, the first shaft (X1) is disposed in a direction pointed to by the direction of rotation of the lower end portion of the outermost gear (7A/8A), which is disposed on the second axis (X2), when the vehicle is moving forward, and the suction port (22) is disposed between the first axis (X1) and the second axis (X2), which makes it possible to efficiently collect oil transported by the rotating outermost gear (7A/8A) at the suction port (22). Since the inner surface part of the peripheral wall section (91) facing the lower surface of the rotating electric machine (1) is downwardly inclined toward the suction port (22), oil that has cooled the rotating electric machine (1) can be received by the inner surface of the peripheral wall section (91) and caused to flow down toward the suction port (22). By drawing in both the oil transported by the outermost gear (7A/8A) on the second axis (X2) and the oil flowing down from the rotating electric machine (1) side on the first axis (X1) from the suction port (22), it is possible to supply a sufficient amount of oil to the oil pump (20). Accordingly it is possible to effectively prevent the production of air bubbles at the air pump (20) (that is, the drawing in of air at the oil pump (20)).

As another aspect,
- the oil pump (20) preferably further includes a strainer (21) for passing the oil that has been drawn in from the suction port (22), and
- the strainer (21) is preferably inserted into an opening (101) formed in the case (CS) in a direction intersecting the axial direction (L), and is fixed in position.

According to this configuration, the strainer (21) can be mounted from outside the case (CS), which facilitates the task of mounting the strainer (21). In addition, the position of the suction port (22) can be set at a lower position compared to a case where the strainer (21) is mounted along the axial direction (L) inside the case (CS). Accordingly, it is possible to suppress the production of air bubbles at the oil pump (20).

As another aspect,
- in the axial direction (L) view, the suction port (22) is preferably disposed adjacent to the lower end portion of the outermost gear (7A/8A) in the width direction (H) and upwardly adjacent to a bottom surface of the peripheral wall section (91).

According to this configuration, when the vehicle is moving forward, oil that has collected at the bottom of the case (CS) can be efficiently guided to the suction port (22) by the rotation of the outermost gear (7A/8A).

As another aspect,
- the vehicle drive device (100) preferably further includes a first plate (141) disposed between the lower end portion of the outermost gear (7A/8A) and the suction port (22) in the width direction (H), the first plate extending along a tangential direction at a lower end portion of the outermost gear (7A/8A).

According to this configuration, oil that has been scooped up by the outermost gear (7A/8A) when the vehicle is moving forward can be guided along the first plate (141) to the suction port (22). In particular, it is possible to prevent oil from escaping through a gap in the radial direction between the differential gear mechanism (6) and the strainer (21) and efficiently guide the oil to the suction port (22).

As another aspect,
- the vehicle drive device (100) preferably further includes a second plate (142) disposed between a lower end portion of the outermost gear (7A/8A) and the suction port (22) in the width direction (H), the second plate extending in a direction intersecting a flow of oil caused by rotation of the outermost gear (7A/8A).

According to this configuration, by partially blocking the flow of oil scooped up by the outermost gear (7A/8A) with the second plate (142), it is possible to reduce the flow velocity of the oil. As a result, the oil will stay in the vicinity of the suction port (22) for a long time, which makes it possible to effectively prevent the production of air bubbles at the oil pump (20).

As another aspect, the case (CS) preferably forms at least a first housing space (P1), in which the rotating electric machine (1) is housed, and a third housing space (P3), in which at least part of the power transmission mechanism (3) is disposed, and includes a support wall (SW1) for partitioning the first housing space (P1) and the third housing space (P3) in the axial direction (L), and the support wall (SW1) preferably includes a communication hole (131) communicating the first housing space (P1) with the third housing space (P3).

According to this configuration, oil for purposes such as cooling the first rotating electric machine (1) in the first housing space (P1) can be smoothly discharged through the communication hole (131) to the third housing space (P3). Accordingly, it is possible to avoid oil stagnating in the first housing space (P1).

As another aspect, separately from the communication hole (131), the support wall (SW1) preferably further includes an oil return hole (133) for returning oil from the first housing space (P1) to the third housing space (P3), and the oil return hole (133) is preferably disposed radially inward of the outermost gear (7A/8A).

According to this configuration, oil for purposes such as cooling the first rotating electric machine (1) in the first housing space (P1) can be smoothly discharged to the third housing space (P3) through the oil return hole (133) separately to the communication hole (131). Here, since the oil return hole (133) is disposed radially inward of the outermost gear (7A/8A), the oil that has been scooped up by the outermost gear (7A/8A) is unlikely to produce a backflow. Accordingly for these reasons also, it is possible to more reliably avoid oil stagnating in the first housing space (P1).

As another aspect, a first rotating electric machine (1A) and a second rotating electric machine (1B) are preferably provided as the rotating electric machine (1), a first output member (2A) in driving connection with a first wheel (W) and a second output member (2B) in driving connection with a second wheel (W) are preferably provided as the output member (2), the power transmission mechanism (3) preferably further includes: a first gear (4A) coupled to rotate integrally with a rotor (12A) of the first rotating electric machine (1A); a second gear (4B) coupled to rotate integrally with a rotor (12B) of the second rotating electric machine (1B); a first counter gear mechanism (5A) including a third gear (51A) meshing with the first gear (4A) and a fourth gear (52A) rotating integrally with the third gear (51A); and a second counter gear mechanism (5B) including a fifth gear (51B) meshing with the second gear (4B) and a sixth gear (52B) integrally rotating with the fifth gear (51B), the output gear mechanism (6) preferably includes a seventh gear (7A) meshing with the fourth gear (52A) and an eighth gear (7B) meshing with the sixth gear (52B), and at least one of the seventh gear (7A) and the eighth gear (7B) is preferably the outermost gear (7A/8A).

According to this configuration, the driving force of the first rotating electric machine (1A) transmitted via the first counter gear mechanism (5A) and the driving force of the second rotating electric machine (1B) transmitted via the second counter gear mechanism (5B) can be appropriately distributed and outputted by the differential gear mechanism (6) to the first output member (2A) and the second output member (2B). At least one of the seventh gear (7A) and the eighth gear (7B) is used as the "outermost gear (7A/8A)", and as described in detail later, oil that has collected at the bottom of the case (CS) can be transported toward a suction port (22) and efficiently guided to the suction port (22).

As another aspect, the output gear mechanism (6) preferably distributes and transmits driving force transmitted from the first rotating electric machine (1A) and the second rotating electric machine (1B) to the first output member (2A) and the second output member (2B), the vehicle drive device (100) includes a configuration in which:

a region in the axial direction (L) where the output gear mechanism (6) is disposed and a region in the axial direction (L) where the first rotating electric machine (1A) is disposed preferably overlap; and a region in the axial direction (L) where the oil pump (20) is disposed and a region in the axial direction (L) where the second rotating electric machine (1B) is disposed preferably overlap.

According to this configuration, the differential gear mechanism (6) and the oil pump (20) can be disposed using spaces that are radially outside the first rotating electric machine (1A) and the second rotating electric machine (1B). This means that it is possible to suppress increases in size in the axial direction (L) of the vehicle drive device (100).

As another aspect, the case (CS) preferably forms a first housing space (P1) in which the first rotating electric machine (1A) is housed in the axial direction, a second housing space (P2) in which the second rotating electric machine (1B) is housed in the axial direction (L), and a third housing space (P3) that is provided between the first housing space (P1) and the second housing space (P2) in the axial direction (L) and in which at least part of the power transmission mechanism (3) is disposed, and the suction port (22) is preferably disposed in the third housing space (P3) in a state where the suction port communicates with both the first housing space (P1) and the second housing space (P2).

According to this configuration, it is possible to guide both oil that has cooled the first rotating electric machine (1A) and oil that has cooled the second rotating electric machine (1B) to the suction port (22).

As another aspect, it is preferable to further include an oil supplying section (97) configured to supply oil to the rotating electric machine (1), wherein the oil supplying section (97) is preferably provided above the rotating electric machine (1) as a pair of sections split between both sides of the first axis (X1) in the width direction (H).

According to this configuration, by providing two oil supplying sections (97) for a single rotating electric machine (1), it is easy to increase the supplied amount of oil, which can enhance cooling performance for the rotating electric machine (1). Also, by disposing a pair of oil supplying sections (97) in such a manner as to be split between both sides in the width direction (H) with the first axis (X1) in between, it is possible to dispose the pair of oil supplying sections (97) while avoiding the highest point of the rotating electric machine (1), which makes it possible to avoid an increase in the size of the vehicle drive device (100) as a whole.

As another aspect, a first rotating electric machine (1A) including a first rotor (12A) and a second rotating electric machine (1B)

including a second rotor (12B) are preferably provided as the rotating electric machine (1), and the vehicle drive device (100) preferably further includes a shared oil supplying path (122) for supplying oil to an inside of a hollow first rotor shaft (13A) connected to the first rotor (12A) and to an inside of a hollow second rotor shaft (13B) connected to the second rotor (12B) between the first rotating electric machine (1A) and the second rotating electric machine (1B) in the axial direction (L) of the case (CS).

According to this configuration, it is possible to reduce the size in the axial direction (L) of the entire vehicle drive device (100) compared to a configuration where an oil path for supplying oil to the inside of the first rotor shaft (13A) and an oil path for supplying oil to the inside of the second rotor shaft (13B) are separately provided at different positions in the axial direction (L).

As another aspect, the vehicle drive device (100) preferably further includes plugs (123) for adjusting a flow of oil, respectively at a portion of the shared oil supplying path (122) connected to the first rotor shaft (13A) and a portion of the shared oil supplying path (122) connected to the second rotor shaft (13B).

According to this configuration, the plugs (123) can adjust the flow rates of oil flowing from the shared oil supplying path (122) to the inside of the first rotor shaft (13A) and the inside of the second rotor shaft (13B). Accordingly when the first rotor (12A) and the second rotor (12B) are cooled using the oil flowing inside the first rotor shaft (13A) and the second rotor shaft (13B) for example, the cooling performance can be improved while suppressing the amount of oil expelled from the oil pump (20) to a small amount, which raises efficiency.

As another aspect, the case (CS) preferably includes an end wall section (92/93) that covers one end portion in the axial direction (L), the end wall section (92/93) preferably rotatably supports a rotor shaft (13A/13B) connected to the rotor (12A/12B) of the rotating electric machine (1) via a rotor bearing (115A/115B), and the end wall section (92/93) preferably includes a bearing oil supplying path (113A/113B) for supplying oil to the rotor bearing (115A/115B) along the end wall section (92/93).

According to this configuration, oil that has flowed down along the end wall section (92/93) can be supplied to the bearings (115A/115B) through the bearing oil supplying paths (113A/113B). Accordingly the bearings (115A/115B) that rotatably support the rotor shafts (13A/13B) can be properly lubricated.

A vehicle drive device according to the present disclosure may achieve at least one of the effects described above.

DESCRIPTION OF REFERENCE SIGNS

1: Rotating electric machine
1A: First rotating electric machine
1B: Second rotating electric machine
2: Output member
2A: First output member
2B: Second output member
3: Power transmission mechanism
4A: First input gear (First gear)
4B: Second input gear (Second gear)
5A: First counter gear mechanism
5B: Second counter gear mechanism
6: Differential gear mechanism (Output gear mechanism)
7A: First differential input gear (Seventh gear)
7B: Second differential input gear (Eighth gear)
8A: First connecting member
8B: Second connecting member
9A: First connecting shaft
9B: Second connecting shaft
11A: First stator
11B: Second stator
12A: First rotor
12B: Second rotor
13A: First rotor shaft
13B: Second rotor shaft
14A: First shaft internal oil path
14B: Second shaft internal oil path
20: Oil pump
21: Strainer
22: Suction port
51A: First counter input gear (Third gear)
51B: Second counter input gear (Fifth gear)
52A: First counter output gear (Fourth gear)
52B: Second counter output gear (Sixth gear)
53A: First counter shaft
53B: Second counter shaft
91: Peripheral wall section
91A: Facing inner surface
92: First cover section (End wall section)
92S: First tubular section
93: Second cover section (End wall section)
93S: Second tubular section
95: Communication path
97: Oil supplying section
100: Vehicle drive device
101: Opening
103: Cap
111A: First oil supplying section
111B: Second oil supplying section
113A: First bearing oil supplying path
113B: Second bearing oil supplying path
115A: Bearing
115B: Bearing
121: Third oil supplying section
122: Shared oil supplying path
123: Plug
126: Central supporting wall section
131: Communication hole
133: Oil return hole
133A: Inner oil return hole
133B: Outer oil return hole
135: Shield rib
136: Communication hole
137: Oil return hole
141: First plate
142: Second plate
C6: Carrier
CS: Case
CS1: First case section
CS2: Second case section
CS3: Third case section
CS4: Fourth case section
CS5: Fifth case section
FW: Rotational direction when moving forward
H: Width direction
H1: Width direction-first side
H2: Width direction-second side
L: Axial direction L1: Axial direction-first side
L2: Axial direction-second side
P1: First housing space
P2: Second housing space
P3: Third housing space
P61: First pinion gear
P62: Second pinion gear
P63: Pinion shaft
R6: Ring gear
S61: First sun gear
S62: Second sun gear
SW1: First support wall (Support wall)
SW2: Second support wall
W: Wheel
W1: First wheel
W2: Second wheel
X1: First axis
X2: Second axis
X3: Third axis

The invention claimed is:

1. A vehicle drive device comprising:
a rotating electric machine disposed on a first axis;
an output member disposed on a second axis, which differs from the first axis, and in driving connection with a wheel;
a power transmission mechanism configured to transmit torque of the rotating electric machine to the output member;
a case configured to house the rotating electric machine and the power transmission mechanism; and
an oil pump including a suction port, and configured to expel oil drawn in from the suction port, and to supply oil for cooling to the rotating electric machine,
wherein the power transmission mechanism includes an output gear mechanism disposed on the second axis,
the case includes a peripheral wall section surrounding the rotating electric machine and the output gear mechanism,
with (i) a direction parallel to the first axis and the second axis being an axial direction, (ii) a direction perpendicular to a vertical direction in an axial direction view along the axial direction in a state where the vehicle drive device has been mounted in a vehicle being a width direction, and (iii) a gear disposed in an outermost periphery of the output gear mechanism being an outermost gear,
the second axis is disposed below the first axis,
the suction port is disposed between the first axis and the second axis in the width direction, and is disposed below the first axis and the second axis in the vertical direction,
the outermost gear is disposed so that a direction of rotation at a lower end portion of the outermost gear while the vehicle is moving forward points toward the suction port in the width direction, and
a facing portion of an inner surface of the peripheral wall section facing a lower surface of the rotating electric machine is downwardly inclined in the width direction toward the suction port, and the suction port is disposed below the facing portion so as to cause oil dropped from the rotating electric machine to flow down along the facing portion toward the suction port, wherein the facing portion overlaps the rotating electric machine when viewed along the vertical direction.

2. The vehicle drive device according to claim 1,
wherein the oil pump further includes a strainer for passing the oil that has been drawn in from the suction port, and
the strainer is inserted into an opening formed in the case in a direction intersecting the axial direction, and is fixed in position.

3. The vehicle drive device according to claim 1,
wherein in the axial direction view, the suction port is disposed adjacent to the lower end portion of the outermost gear in the width direction and upwardly adjacent to a bottom surface of the peripheral wall section.

4. The vehicle drive device according to claim 1,
wherein the vehicle drive device further includes a first plate disposed between the lower end portion of the outermost gear and the suction port in the width direction, the first plate extending along a tangential direction at a lower end portion of the outermost gear.

5. The vehicle drive device according to claim 1,
wherein the vehicle drive device further includes a second plate disposed between a lower end portion of the outermost gear and the suction port in the width direction, the second plate extending in a direction intersecting a flow of oil caused by rotation of the outermost gear.

6. The vehicle drive device according to claim 1,
wherein the case forms at least a first housing space, in which the rotating electric machine is housed, and a third housing space, in which at least part of the power transmission mechanism is disposed, and includes a support wall for partitioning the first housing space and the third housing space in the axial direction, and
the support wall includes a communication hole communicating the first housing space with the third housing space.

7. The vehicle drive device according to claim 6,
wherein, separately from the communication hole, the support wall further includes an oil return hole for returning oil from the first housing space to the third housing space, and
the oil return hole is disposed radially inward of the outermost gear.

8. The vehicle drive device according to claim 1,
comprising, as the rotating electric machine, a first rotating electric machine and a second rotating electric machine, and
comprising, as the output member, a first output member in driving connection with a first wheel and a second output member in driving connection with a second wheel,
wherein the power transmission mechanism further includes:
a first gear coupled to rotate integrally with a rotor of the first rotating electric machine;
a second gear coupled to rotate integrally with a rotor of the second rotating electric machine;
a first counter gear mechanism including a third gear meshing with the first gear and a fourth gear rotating integrally with the third gear; and
a second counter gear mechanism including a fifth gear meshing with the second gear and a sixth gear integrally rotating with the fifth gear,
the output gear mechanism includes a seventh gear meshing with the fourth gear and an eighth gear meshing with the sixth gear, and at least one of the seventh gear and the eighth gear is the outermost gear.

9. The vehicle drive device according to claim 8,
wherein the output gear mechanism distributes and transmits driving force transmitted from the first rotating electric machine and the second rotating electric machine to the first output member and the second output member, the vehicle drive device includes a configuration in which:
a region in the axial direction where the output gear mechanism is disposed and a region in the axial direction where the first rotating electric machine is disposed overlap; and
a region in the axial direction where the oil pump is disposed and a region in the axial direction where the second rotating electric machine is disposed overlap.

10. The vehicle drive device according to claim 8,
wherein the case forms a first housing space in which the first rotating electric machine is housed in the axial direction, a second housing space in which the second rotating electric machine is housed in the axial direction, and a third housing space that is provided between the first housing space and the second housing space in the axial direction and in which at least part of the power transmission mechanism is disposed, and
the suction port is disposed in the third housing space in a state where the suction port communicates with both the first housing space and the second housing space.

11. The vehicle drive device according to claim 1,
further comprising an oil supplying section configured to supply oil to the rotating electric machine, and
wherein the oil supplying section is provided above the rotating electric machine as a pair of sections split between both sides of the first axis in the width direction.

12. The vehicle drive device according to claim 1,
comprising, as the rotating electric machine, a first rotating electric machine including a first rotor and a second rotating electric machine including a second rotor,
wherein the vehicle drive device further includes a shared oil supplying path for supplying oil to an inside of a hollow first rotor shaft connected to the first rotor and to an inside of a hollow second rotor shaft connected to the second rotor between the first rotating electric machine and the second rotating electric machine in the axial direction of the case.

13. The vehicle drive device according to claim 12,
wherein the vehicle drive device further includes plugs for adjusting a flow of oil, respectively at a portion of the shared oil supplying path connected to the first rotor shaft and a portion of the shared oil supplying path connected to the second rotor shaft.

14. The vehicle drive device according to claim 1,
wherein the case includes an end wall section that covers one end portion in the axial direction,
the end wall section rotatably supports a rotor shaft connected to the rotor of the rotating electric machine via a rotor bearing, and
the end wall section includes a bearing oil supplying path for supplying oil to the rotor bearing along the end wall section.

* * * * *